United States Patent
Wang

(10) Patent No.: US 11,281,289 B2
(45) Date of Patent: Mar. 22, 2022

(54) CONTENT ADJUSTMENT BASED ON VEHICLE MOTION AND EYE GAZE

(71) Applicant: Honda Motor Co., Ltd., Tokyo (JP)

(72) Inventor: Yuchen Wang, Cupertino, CA (US)

(73) Assignee: Honda Motor Co., Ltd., Tokyo (JP)

( * ) Notice: Subject to any disclaimer, the term of this patent is extended or adjusted under 35 U.S.C. 154(b) by 124 days.

(21) Appl. No.: 16/797,879

(22) Filed: Feb. 21, 2020

(65) Prior Publication Data

US 2021/0263586 A1 Aug. 26, 2021

(51) Int. Cl.

| | |
|---|---|
| G06F 3/01 | (2006.01) |
| B60K 35/00 | (2006.01) |
| G06N 3/08 | (2006.01) |
| B60R 11/04 | (2006.01) |
| G06V 20/59 | (2022.01) |
| G06V 40/20 | (2022.01) |
| B60R 11/00 | (2006.01) |

(52) U.S. Cl.
CPC .............. *G06F 3/013* (2013.01); *B60K 35/00* (2013.01); *B60R 11/04* (2013.01); *G06F 3/012* (2013.01); *G06F 3/017* (2013.01); *G06N 3/08* (2013.01); *G06V 20/59* (2022.01); *G06V 40/28* (2022.01); *B60K 2370/736* (2019.05); *B60K 2370/744* (2019.05); *B60R 2011/0005* (2013.01)

(58) Field of Classification Search
CPC ........................ G06K 9/00355; G06K 9/00832; B60R 11/04; G06F 3/013; G06F 3/012; G06F 3/017; B60K 9/00355; B60K 35/00
See application file for complete search history.

(56) References Cited

U.S. PATENT DOCUMENTS

| | | |
|---|---|---|
| 7,688,306 B2 | 3/2010 | Wehrenberg et al. |
| 8,441,441 B2 | 5/2013 | Tsai et al. |
| 8,462,109 B2 | 6/2013 | Nasiri et al. |
| 8,653,961 B2 | 2/2014 | Kumon |
| 8,698,744 B2 | 4/2014 | Wehrenberg et al. |
| 8,854,433 B1 | 10/2014 | Rafii |
| 8,982,160 B2 | 3/2015 | Yee et al. |
| 9,075,563 B2 | 7/2015 | Kim |
| 9,153,009 B2 | 10/2015 | Kim |
| 9,426,193 B2 | 8/2016 | Goodman |

(Continued)

FOREIGN PATENT DOCUMENTS

JP 4906450 B2 3/2012

*Primary Examiner* — Parul H Gupta
(74) *Attorney, Agent, or Firm* — American Honda Motor Co., Inc.; Aaron Fong

(57) ABSTRACT

A display apparatus and a mobile phone for content adjustment based on motion of a vehicle and an eye gaze of an occupant is provided. The display apparatus includes a display screen, a motion sensor, and an image capturing device. The display screen displays content. The display apparatus controls the motion sensor to capture a motion signal associated with the display apparatus. The display apparatus controls the image capturing device to capture an image of the occupant in the vehicle. The display apparatus determines a region of the eye gaze of the occupant on the display screen based on the captured image. The determined region on the display screen includes a portion of the displayed content. The display apparatus adjusts a movement of the portion of the displayed content in response to the captured motion signal being higher than a predefined threshold.

20 Claims, 8 Drawing Sheets

(56) References Cited

U.S. PATENT DOCUMENTS

| | | | |
|---|---|---|---|
| 9,992,461 B1 | 6/2018 | Schreiber et al. | |
| 2006/0230108 A1* | 10/2006 | Tatsuta | A61B 5/02055 709/204 |
| 2009/0289895 A1* | 11/2009 | Nakada | G06F 3/015 345/157 |
| 2012/0154441 A1* | 6/2012 | Kim | G06F 3/147 345/633 |
| 2013/0155237 A1* | 6/2013 | Paek | G06F 3/048 348/148 |
| 2014/0019041 A1* | 1/2014 | Kluge | G01C 21/3469 701/430 |
| 2014/0354539 A1* | 12/2014 | Skogo | G06F 3/0304 345/156 |
| 2015/0067580 A1* | 3/2015 | Um | G06F 3/048 715/781 |
| 2015/0120149 A1* | 4/2015 | Worrel | B60H 1/00742 701/49 |
| 2015/0205135 A1* | 7/2015 | Border | G06F 3/017 359/630 |
| 2015/0339527 A1* | 11/2015 | Plummer | G06F 3/013 348/78 |
| 2016/0034042 A1* | 2/2016 | Joo | G02B 27/017 345/633 |
| 2017/0161949 A1 | 6/2017 | Seder et al. | |
| 2017/0200449 A1* | 7/2017 | Penilla | G10L 15/063 |
| 2018/0178808 A1 | 6/2018 | Zhao et al. | |
| 2019/0047498 A1 | 2/2019 | Alcaidinho et al. | |
| 2021/0009009 A1* | 1/2021 | Geiger | B60N 2/0244 |

\* cited by examiner

US 11,281,289 B2

CONTENT ADJUSTMENT BASED ON VEHICLE MOTION AND EYE GAZE

BACKGROUND

With the advancement in in-vehicle displays (especially multi-information displays (MIDs) or smart devices) occupant(s) of the vehicles prefer watching or reading content while the vehicle is in a motion. Typically, due to the motion of the vehicle, the in-vehicle displays may experience some motion or vibration, which may further cause motion sickness with the occupants present in the vehicle while watching the content displayed on the in-vehicle displays. This motion sickness may affect the physical as well as mental health of the occupant(s) which may be undesirable. Therefore, there is need of smart device which may avoid the motion sickness faced by the occupant(s) due to the motion of the vehicle.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, a display apparatus for content adjustment based on vehicle motion and eye gaze is provided. The display apparatus may include a display screen, at least one motion sensor, an image capturing device, and circuitry. The display screen may be configured to display content. The image capturing device may be disposed at a first side of the display apparatus. The circuitry may be coupled with the display screen, the at least one first motion sensor, and the image capturing device. The circuitry may be configured to control the at least one first motion sensor to capture a first motion signal associated with the display apparatus. The circuitry may be further configured to control the image capturing device to capture a first image of an occupant in a vehicle. The circuitry may be further configured to determine a region of an eye gaze of the occupant on the display screen based on the captured first image. The determined region on the display screen may include a portion of the displayed content. The circuitry may be further configured to adjust a movement of the portion of the displayed content in response to the captured first motion signal being higher than a predefined threshold.

According to another embodiment of the disclosure, a mobile phone for content adjustment based on vehicle motion and eye gaze is provided. The mobile phone may include a display screen, at least one motion sensor, an image capturing sensor, and circuitry. The display screen may be configured to display content. The image capturing sensor may be disposed at a first side of the mobile phone. The circuitry may be coupled with the display screen, the at least one first motion sensor, and the image capturing sensor. The circuitry may be configured to control the at least one first motion sensor to capture a first motion signal associated with the mobile phone. The circuitry may be further configured to control the image capturing device to capture a first image of an occupant in a vehicle. The circuitry may be further configured to determine a region of an eye gaze of the occupant on the display screen based on the captured first image. The determined region on the display screen may include a portion of the displayed content. The circuitry may be further configured to adjust a movement of the portion of the displayed content in response to the captured first motion signal being higher than a predefined threshold.

According to another embodiment of the disclosure, a display apparatus for content adjustment based on vehicle motion and eye gaze is provided. The display apparatus may include a memory, at least one first motion sensor, a display screen, and circuitry. The memory may be configured to store a machine learning model. The machine learning model may be trained to determine degree of adjustments of content based on a set of driving parameters of a vehicle and motion information associated with the display apparatus. The display screen may be configured to display content. The circuitry may be coupled with the display screen, the at least one first motion sensor, and the memory. The circuitry may be configured to control the at least one first motion sensor to capture a first motion signal associated with the display apparatus. The circuitry may be further configured to retrieve one or more first driving parameters associated with one of the vehicle or an occupant present in the vehicle. The circuitry may be further configured to apply the trained machine learning model on the captured first motion signal and the retrieved one or more first driving parameters to determine a first degree of adjustment for the displayed content. The circuitry may be further configured to adjust a movement the displayed content on the display screen based on the determined first degree of adjustment.

Figure 1:
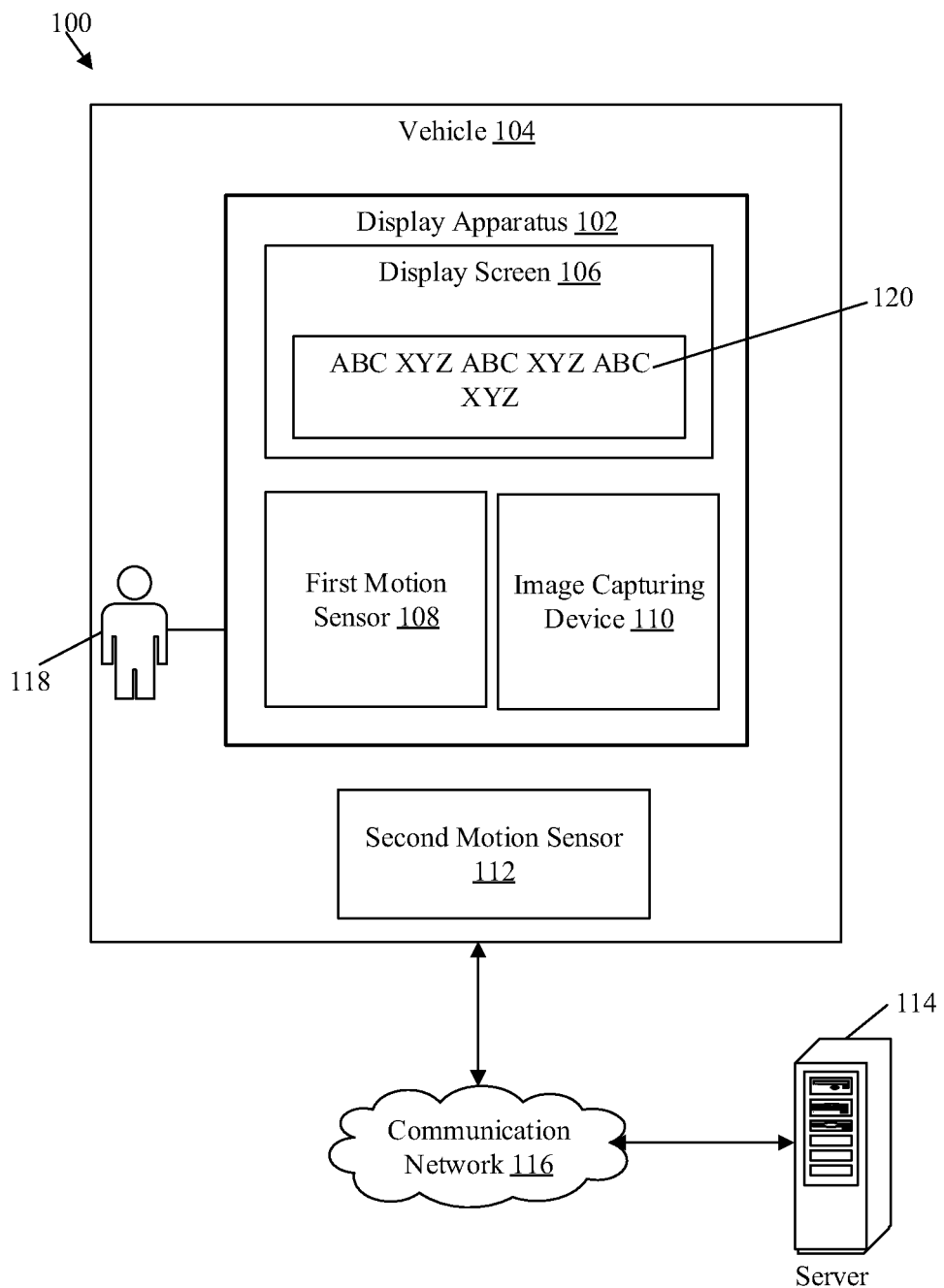
FIG. 1 is a block diagram that illustrates an exemplary vehicle that includes a display apparatus for content adjustment based on vehicle motion and an eye gaze of an occupant, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a disclosed display apparatus of a vehicle for the adjustment of displayed content, based on vehicle motion and an eye gaze of an occupant of the vehicle on the display apparatus. Exemplary aspects of the disclosure may provide a display apparatus that may include a display screen configured to display content (such as video, image, or text). The disclosed display apparatus may also include a motion sensor and an image capturing device. The display apparatus may control the motion sensor to measure the motion (or vibration) associated with the display apparatus that may be caused by the motion (for example bumps, acceleration/deacceleration, or turns) of the vehicle. The display apparatus may further control the image capturing device to capture an image of the occupant (for example driver or passenger on a front or rear seat) to further determine a region of eye gaze of the occupant on the displayed content. The disclosed display apparatus may further adjust the displayed content in accordance with the combination of the measured motion of the display apparatus (or the vehicle) and the determined eye gaze of the occupant of the vehicle. The automatic adjustment or stabilization of the displayed content based on the real-time measurement of the motion (or vibration) and the eye gaze of the occupant may further reduce motion sickness or health issues of the occupant during a travel in the vehicle.

The disclosed display apparatus may include a machine learning model which may be trained on various driving parameters (such as, but not limited to, speed of the vehicle, driving behavior of the driver of the vehicle, or past motion information of current route of the vehicle) to determine a degree of adjustment of the displayed content based on the combination of the real-time determination of the motion of the vehicle, the eye gaze of the occupant, and at least one driving parameter. In some embodiments, the display apparatus may correspond to a mobile phone associated with the occupant of the vehicle.

Reference will now be made in detail to specific aspects or features, examples of which are illustrated in the accompanying drawings. Wherever possible, corresponding or similar reference numbers will be used throughout the drawings to refer to the same or corresponding parts.

FIG. 1 is a block diagram that illustrates an exemplary vehicle that includes a display apparatus for content adjustment based on vehicle motion and an eye gaze of an occupant, in accordance with an embodiment of the disclosure. With reference to FIG. 1, there is shown a diagram 100 of a vehicle 104 which may include a display apparatus 102. The display apparatus 102 may further include a display screen 106. In FIG. 1, there is shown a first motion sensor 108 and an image capturing device 110 on the display apparatus 102. There is further shown a second motion sensor 112 disposed on the vehicle 104. The vehicle 104 may be connected with a server 114, via a communication network 116. There is further shown an occupant 118 of the vehicle 104. In FIG. 1, there is further shown content 120 that may be displayed on the display screen 106 and rendered to the occupant 118 of the vehicle 104.

The display apparatus 102 may include suitable logic, circuitry, interfaces, and/or code that may be configured to adjust the movement of the content 120 displayed on the display screen 106 based on the motion of the vehicle 104. The display apparatus 102 may be configured to control the first motion sensor 108 to capture a motion signal associated with the display apparatus 102. The display apparatus 102 may be further configured to control the image capturing device 110 to capture an image of the occupant 118 of the vehicle 104 and determine a region of an eye gaze of the occupant 118 on the display screen 106 based on the captured first image. The determined region of the eye gaze on the display screen 106 may include a portion of the displayed content 120. The display apparatus 102 may be further configured to adjust a movement of the portion of the displayed content 120 in response to the captured motion signal being higher than a predefined threshold. Examples of the display apparatus 102 of the vehicle 104 may include, but are not limited to, a multi-information display (MID) panel, a digital instrument cluster, an automotive HUD, an automotive dashboard, or a consumer-electronic (CE) device.

The vehicle 104 may be a non-autonomous vehicle, a semi-autonomous vehicle, or a fully autonomous vehicle, for example, as defined by National Highway Traffic Safety Administration (NHTSA). Examples of the vehicle 104 may include, but are not limited to, a two-wheeler vehicle, a three-wheeler vehicle, a four-wheeler vehicle, a hybrid vehicle, or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. The vehicle 104 may be a system through which the occupant 118 (for example rider) may travel from a start point to a destination point. Examples of the two-wheeler vehicle may include, but are not limited to, an electric two-wheeler, an internal combustion engine (ICE)-based two-wheeler, or a hybrid two-wheeler. Similarly, examples of the four-wheeler vehicle may include, but are not limited to, an electric car, an internal combustion engine (ICE)-based car, a fuel-cell based car, a solar powered-car, or a hybrid car. It may be noted here that the block diagram of the vehicle 104 is merely shown as examples in FIG. 1. The present disclosure may be also applicable to other structures, designs, or shapes of the vehicle 104. The description of other types of the vehicle and respective structures, designs, or shapes has been omitted from the disclosure for the sake of brevity.

The display screen 106 may include suitable logic, circuitry, interfaces, and/or code that may be configured to display the content 120. Examples of the content 120 may include, but are not limited to, a visual media content (such as images or movie), a text document, a multi-media content, map content, an animated content, or a gaming content. The display screen 106 may be a touch screen which may enable a user (such as the occupant 118) to provide a user-input via the display screen 106. The touch screen may be at least one of a resistive touch screen, a capacitive touch screen, or a thermal touch screen. The display screen 106 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display screen 106 may refer to a Multi-Information Display (MID), an automotive Head-Up Display (HUD), an automotive dashboard, an instrument cluster, and/or a display screen of a consumer electronic (CE) device, a mobile phone, a smart phone, a tablet computer, a personal or digital assistant (PDA), a handheld computer, a human machine interface (HMI). In accordance with some other embodiment, the display screen 106 may refer to a display screen of a head mounted device (HMD), a smart-glass device, a see-through display, a projection-based display, an electro-chromic display, or a transparent display.

The first motion sensor 108 may include suitable logic, circuitry, and interfaces that may be configured to detect physical and/or kinetic movements or motion in three-dimensional (3D) space (such as in x, y, and z dimensions) of the display apparatus 102. The first motion sensor 108 may be configured to capture the first motion signal associated with the display apparatus 102, where the first motion signal may indicate the physical and/or kinetic movements, motion, or vibration in the 3D space of the display apparatus 102. The motion in the display apparatus 102 may be caused by the motion or movement of the vehicle 104. The first motion sensor 108 may be disposed on or integrated in the display apparatus 102. Examples of the first motion sensor 108 may include, but are not limited to, an accelerometer, a gyroscope, a tilt sensor, and/or other motion detection sensors.

The image capturing device 110 may include suitable logic, circuitry, and interfaces that may be configured to capture an image of the occupant 118 in the vehicle 104. The image capturing device 110 may be disposed at a first side (for example front side) of the display apparatus 102 such that a field of view (FOV) of the image capturing device 110 may be towards the occupant 118 of the vehicle 104. In some embodiments, the image capturing device 110 may be disposed on an inner surface of the vehicle 104 such that the disposed image capturing device 110 may capture the image of the occupant 118 present inside the vehicle 104. In such case, the image capturing device 110 disposed in the vehicle 104 may transmit the captured image to the display apparatus 102. Examples of the image capturing device 110 may include, but are not limited to, an image sensor, a charge coupled device (CCD), a wide-angle camera, an action camera, a closed-circuit television (CCTV) camera, a camcorder, a digital camera, camera phones, a time-of-flight camera (ToF camera), a night-vision camera, a 360-degree camera, and/or other image capturing devices.

The second motion sensor 112 may include suitable logic, circuitry, and interfaces that may be configured to detect the physical and/or kinetic movements or motion in real time of the vehicle 104. The second motion sensor 112 may be configured to capture a second motion signal associated with the vehicle 104, where the second motion signal may indicate the physical or kinetic movement, motion, or vibration of the vehicle 104 during the movement of the vehicle 104. The second motion sensor 112 may disposed on the vehicle 104. Examples of the second motion sensor 112 may include, but are not limited to, an accelerometer, a gyroscope, a tilt sensor, and/or other motion detection sensors. The number of the first motion sensor 108 and the second motion sensor 112 shown in FIG. 1 is presented merely as an example. The vehicle 104 and the display apparatus 102 may include more than one motion sensors, without deviation from the scope of the disclosure The server 114 may comprise suitable logic, circuitry, interfaces and/or code that may be configured to store the captured first and second motion signals. In some embodiments, the server 114 may be configured to store image of the occupant 118 captured by the image capturing device 110. The server 114 may be configured to store driving pattern information (or driving behavior) of the occupant 118 (or driver) of the vehicle 104. The server 114 may store past motion information (i.e. previous motion or vibration points like bumps, dips, turns, or potholes) associated with current route taken by the vehicle 104. In some embodiments, the server 114 may be configured to train the machine learning model to determine the degree of adjustments of the displayed content based on the motion of the vehicle 104. The server 114 may be further configured to provide the trained machine learning model to the display apparatus 102. The server 114 may also store the content to be displayed on the display apparatus 102. The server 114 may be implemented as a cloud server which may execute operations through web applications, cloud applications, HTTP requests, repository operations, file transfer, and the like. Other examples of the server 114 may include, but are not limited to a database server, a file server, a web server, a media server, content server, an application server, a mainframe server, a cloud server, or other types of servers. In one or more embodiments, the server 114 may be implemented as a plurality of distributed cloud-based resources by use of several technologies that are well known to those skilled in the art.

The communication network 116 may include a communication medium through which the vehicle 104, the display apparatus 102, and the server 114 may communicate with each other. The communication network 116 may be one of a wired connection or a wireless connection. Examples of the communication network 116 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 116 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the occupant 118 may be travelling in the vehicle 104 to a particular destination point. The display apparatus 102 disposed in the vehicle 104 may render the content to the occupant 118 who may be the driver or the passenger (being seated on front or rear seat) of the vehicle 104. The route followed by the vehicle 104 to reach the destination point may have bumps, dips, potholes, and/or turns which may cause regular or irregular motion or vibration with the vehicle 104. The motion with the vehicle 104 or with the display apparatus 102 may also be caused by particular acceleration, deacceleration or applied brakes of the vehicle 104. The motion of the display apparatus 102 may further cause the motion or vibration of the displayed content 120 for the occupant 118. The disclosed display apparatus 102 may be configured to adjust the motion or vibration of the displayed content 120 based on the motion of the vehicle 104 or the display apparatus 102 which further avoid motion sickness for the occupant 118 while travelling and watching or reading the content 120.

The display apparatus 102 may include the at least one first motion sensor 108 that may capture the first motion signal associated with the display apparatus 102. The vehicle 104 may include at least one second motion sensor 212 that may capture the second motion signal associated with the vehicle 104. The at least first motion sensor 108 and the at least second motion sensor 112 may include at least one of a tilt sensor, an accelerometer, a gyroscope sensor, or any motion sensor. The first motion signal and the second motion signal may include at least one of a first component for linear motion, a second component for rotatory motion, or a third component for oscillatory motion associated with the display apparatus 102 and/or the vehicle 104.

The display apparatus 102 may be configured to receive the captured first motion signal and the captured second motion signal from the at least first motion sensor 108 and the at least second motion sensor 112, respectively. The display apparatus 102 may be further configured to control the image capturing device 110 to capture the first image of the occupant 118 of the vehicle 104. The capture of the first image of the occupant 118 in the vehicle 104 is further described, for example, in FIG. 3. The display apparatus 102 may be further configured to determine whether the occupant 118 is looking at the content 120 displayed on the display screen 106 based on the captured first image. In a scenario, the occupant 118 may not be looking at the content 120 displayed on the display screen 106. In such a scenario, the display apparatus 102 may not adjust the content 120. In case of determination that the occupant 118 may be looking at the content 120 displayed on the display screen 106, the display apparatus 102 may be further configured to determine a region of an eye gaze of the occupant 118 on the display screen 106 based on the captured first image. The determined region on the display screen 106 may include a portion of the displayed content 120. The determination of the region of the eye gaze on the display screen 106 is further described, for example, in FIG. 3. The display apparatus 102 may be further configured to adjust a movement (or motion/vibration) of the portion of the displayed content 120 in response to the captured first motion signal being higher than a predefined threshold. In some embodiments, the display apparatus 102 may be configured to adjust the movement of the portion (i.e. where the occupant 118 may be focused) of the displayed content based on a combination of the captured first motion signal and the captured second motion signal being higher than the predefined threshold. In an embodiment, the display apparatus 102 may be configured to stabilize a display position of the portion on the display screen 106 to adjust the movement of the portion of the displayed content 120. The stabilized/adjusted display position of the portion of the content 120 on the display screen 106 may reduce the motion sickness for the occupant 118 which may be caused by the motion of the vehicle 104 or the display apparatus 102. The adjustment of the displayed content 120 based on the captured motion signals and determined region of the eye gaze on the display screen 106 is further described, for example, in FIGS. 3, 4, and 5.

It may be noted that the above functionalities of the display apparatus 102 may be implemented by a machine learning model. The machine learning model may be pre-trained to determine or predict different degree of adjustments to stabilize the movement of the portion of the displayed content 120 based on several factors or driving parameters (such as the current motion of the vehicle 104, speed of the vehicle 104, past motion information of the current route taken by the vehicle 104, or driving pattern (or behavior) of the occupant 118 (or driver) of the vehicle 104). The concept of the machine learning model may be described in detail, for example, in FIG. 6. In some embodiments, the above functionalities of the display apparatus 102 may be performed by a mobile phone or a handheld computer associated with or held by the occupant 118 of the vehicle 104 as described in detail, for example, in FIG. 5.

Figure 2:
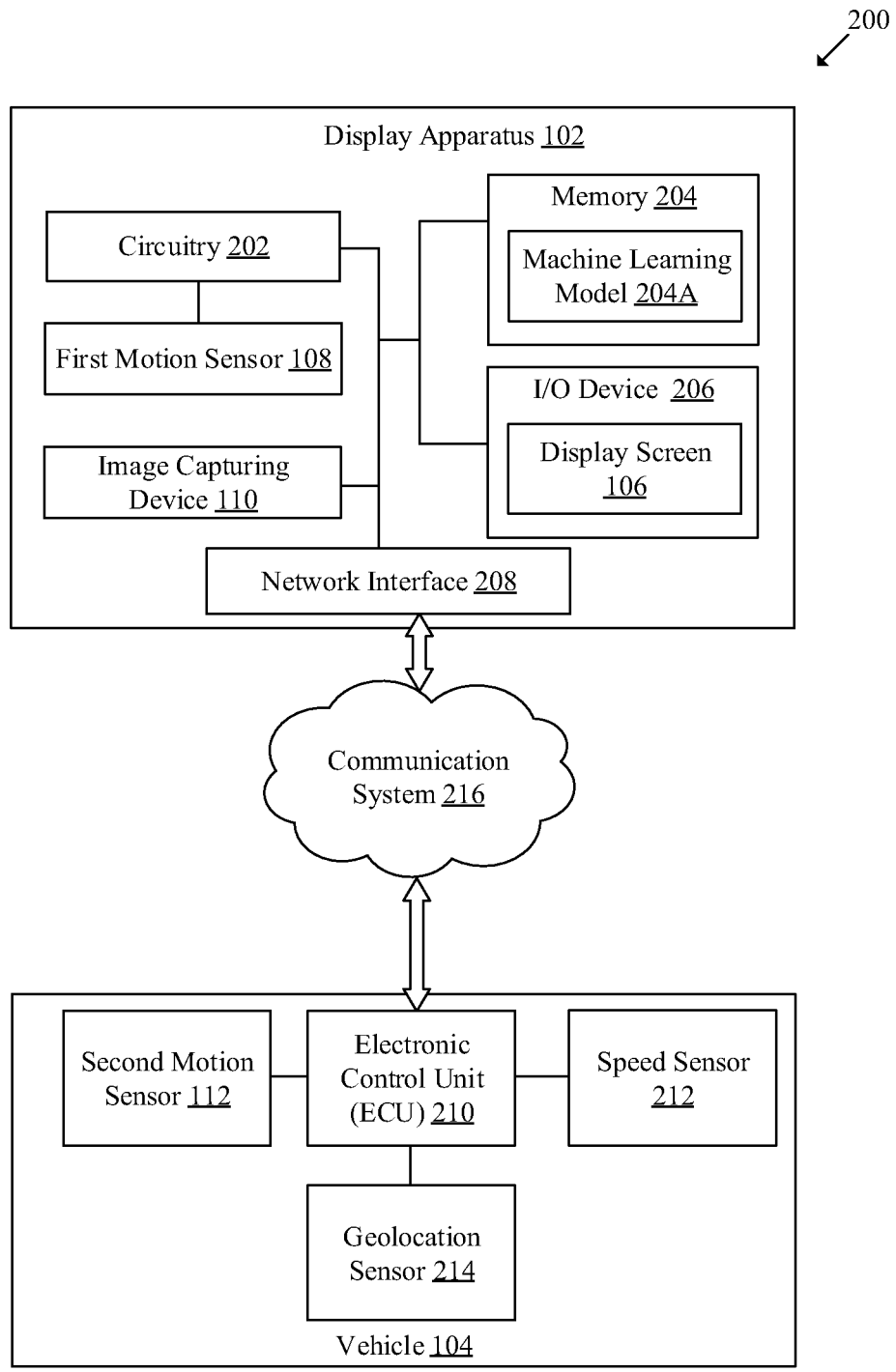
FIG. 2 is a block diagram that illustrates an exemplary display apparatus of FIG. 1 for content adjustment based on vehicle motion and an eye gaze of an occupant, in accordance with an embodiment of the disclosure.

FIG. 2 is a block diagram that illustrates an exemplary display apparatus of FIG. 1 for content adjustment based on vehicle motion and an eye gaze of an occupant, in accordance with an embodiment of the disclosure. FIG. 2 is explained in conjunction with elements from FIG. 1. With reference to FIG. 2, there is shown a block diagram 200 of the display apparatus 102. The display apparatus 102 may include circuitry 202, a memory 204, the image capturing device 110, the first motion sensor 108, an I/O device 206, and a network interface 208. The circuitry 202 may be connected to the memory 204, the image capturing device 110, the first motion sensor 108, the I/O device 206, and the network interface 208, through wired or wireless connections. The memory 204 may further include a machine learning model 204A. The I/O device 206 may include the display screen 106. In FIG. 2, there is further shown the vehicle 104 that may be connected to the display apparatus 102 via the network interface 208 and a communication system 216. The vehicle 104 may include the second motion sensor 112, an electronic control unit (ECU) 210, a speed sensor 212, and a geolocation sensor 214, as shown, for example, in FIG. 2.

Although in FIG. 2, it is shown that the display apparatus 102 includes the circuitry 202, the memory 204, the first motion sensor 108, the image capturing device 110, the I/O device 206, and the network interface 208; however, the disclosure may not be so limiting and the display apparatus 102 may include less or more other components to perform the same or other functions of the display apparatus 102. Details of the other functions and the components have been omitted from the disclosure for the sake of brevity. Although in FIG. 2, it is shown that the vehicle 104 includes the second motion sensor 112, the electronic control unit 210, the speed sensor 212, and the geolocation sensor 214; however, the disclosure may not be so limiting and the vehicle 104 may include less or more components to perform the same or other functions of the vehicle 104 or the display apparatus 102. Details of the other functions and the components have been omitted from the disclosure for the sake of brevity.

The circuitry 202 may include suitable logic, circuitry, interfaces, and/or code that may be configured to execute a set of operations, such as, but not limited to, control of the display screen 106 to display the content 120, control of the first motion sensor 108 to capture the first motion signal, control of the image capturing device 110 to capture the first image of the occupant 118, and/or, adjustment/stabilization of the movement of the content 120 on the display screen 106 based on the captured first motion signal. The circuitry 202 may include any suitable special-purpose or general-purpose computer, computing entity, or processing device including various computer hardware or software modules and may be configured to execute instructions stored on any applicable computer-readable storage media. The circuitry 202 may be implemented based on a number of processor technologies known in the art. For example, the circuitry 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The circuitry 202 may include any number of processors configured to, individually or collectively, perform any number of operations of the display apparatus 102, as described in the present disclosure. Examples of the circuitry 202 may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory 204 may include suitable logic, circuitry, interfaces, and/or code that may be configured to store the set of instructions executable by the circuitry 202. The memory 204 may be configured to store the machine learning model 204A. The machine learning model 204A may be trained to determine a degree of adjustment of the displayed content 120 based on a set of driving parameters of the vehicle 104 and motion information associated with the display apparatus 102. The memory 204 may be further configured to store captured motion signals and the captured image of the occupant 118. The memory 204 may store an association (for example a look up table) between the captured motion signals and the degree of adjustment of the movement of the content 120 displayed on the display screen 106. In some embodiments, the memory 204 may store the past motion information associated with different routes and driving pattern information of the occupant 118 of the vehicle 104. Examples of implementation of the memory 204 may include, but are not limited to, Random Access Memory (RAM), Read Only Memory (ROM), Hard Disk Drive (HDD), a Solid-State Drive (SSD), a CPU cache, and/or a Secure Digital (SD) card. The machine learning model 204A may be described in detail, for example, in FIG. 6.

The I/O device 206 may include suitable logic, circuitry, interfaces, and/or code that may be configured to may receive user inputs and generate outputs in response to the received user inputs. The I/O device 206 may include the display screen 106. The I/O device 206 may include one or more input and output devices that may communicate with different components of the display apparatus 102 and the vehicle 104, via an in-vehicle communication network (such as the communication system 216). Examples of the I/O device 206 may include, but are not limited to, the display screen 106, a touch screen, a digital dial/knob, a touch buttons, a microphone, a gesture controller, and/or an image sensor.

The display screen 106 may include suitable logic, circuitry, and interfaces that may be configured to display the content 120. The display screen 106 may be a touch screen which may enable a user to provide a user-input via the display screen 106. The touch screen may be at least one of a resistive touch screen, a capacitive touch screen, or a thermal touch screen. The display screen 106 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display screen 106 may refer to a display screen of a head mounted device (HMD), a smart-glass device, a see-through display, a projection-based display, an electro-chromic display, or a transparent display.

The network interface 208 may include suitable logic, circuitry, and interfaces that may be configured to facilitate communication between the circuitry 202, the vehicle 104 and the server 114, via the communication system 216 and the communication network 116, respectively. The network interface 208 may be implemented by use of various known technologies to support wired or wireless communication of the display apparatus 102 with the communication network 116 and the communication system 216. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The electronic control unit (ECU) 210 may include suitable logic, circuitry, interfaces, and/or code that may be configured to communicate with the display apparatus 102. The electronic control unit 210 may be a specialized electronic circuitry that may include an ECU processor to control different functions, such as, but not limited to, engine operations, communication operations, and/or data acquisition of the vehicle 104. The electronic control unit (ECU) 210 may control the second motion sensor 112, the speed sensor 212, and the geolocation sensor 214 to measure data (such as the second motion signal, speed of the vehicle 104, and current geo-location of the vehicle 104) and further provide the measure data to the display apparatus 102. The electronic control unit (ECU) 210 may be a microprocessor. Other examples of the electronic control unit (ECU) 210 may include, but are not limited to, a vehicle control system, an in-vehicle infotainment (IVI) system, an in-car entertainment (ICE) system, an automotive Head-up Display (HUD), a human-machine interface (HMI), an automotive dashboard, a computer workstation, and other computing devices. The electronic control unit 210 may be included or integrated in the vehicle 104.

The speed sensor 212 may include suitable logic, circuitry, interfaces, and/or code that may estimate a speed (or speed information) of the vehicle 104 in a direction of the motion of the vehicle 104. The speed may be determined based on a linear displacement of the vehicle 104 or an angular displacement of a front wheel of the vehicle 104. Example of the speed sensor 212 may include, but are not limited to, Hall effect sensors, variable reluctance speed sensors, Radio Frequency (RF) speed sensors, amplified (Active) speed sensors, Light Detection and Ranging (LiDAR) speed sensors, accelerometer-based speed sensors, optical speed sensors, and Antilock Braking System (ABS) speed sensors. In some embodiments, the speed sensor 212 may detect the speed based on engine revolutions, gear ratio, wheel rotation, and the like.

The geolocation sensor 214 may include suitable logic, circuitry, and/or interfaces that may be configured to determine a current geo-location of the vehicle 104. The circuitry 202 may be further configured to capture navigation information that may indicate a route (i.e. associated with the vehicle 104 to reach the destination point) based on the current geo-location determined by the geolocation sensor 214. Examples of the geolocation sensor 214, may include, but are not limited to, a Global Navigation Satellite System (GNSS)-based sensor of the vehicle 104. Examples of the GNSS-based sensor may include, but are not limited to, global positioning sensor (GPS), Global Navigation Satellite System (GLONASS), or other regional navigation systems or sensors.

The functions or operations executed by the display apparatus 102, as described in FIG. 1, may be performed by the circuitry 202. Operations executed by the circuitry 202 are described in detail, for example, in the FIGS. 3, 4, 5, 6, 7, and 8.

Figure 3:
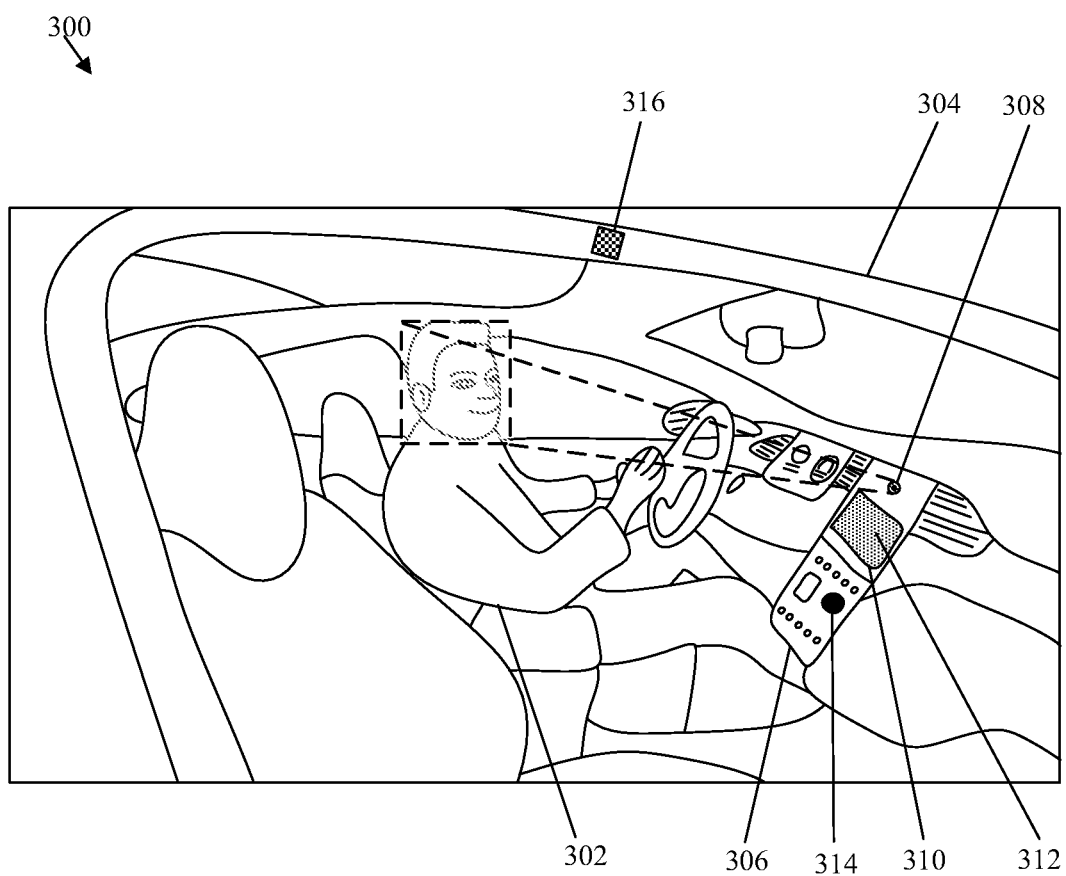
FIG. 3 is a diagram that illustrates an exemplary scenario for content adjustment based on motion of the vehicle and the eye gaze of the occupant, in accordance with an embodiment of the disclosure.

FIG. 3 is a diagram that illustrates an exemplary scenario for content adjustment based on motion of the vehicle and the eye gaze of the occupant, in accordance with an embodiment of the disclosure. FIG. 3 is explained in conjunction with elements from FIG. 1 and FIG. 2. With reference to FIG. 3, there is shown a scenario diagram 300. In the scenario diagram 300, there is shown an occupant 302 who may be present inside a vehicle 304. The vehicle 304 may include a display apparatus 306. The display apparatus 306 may include an image capturing device 308, a display screen 310 (on which content 312 may be displayed for the occupant 302), and a first motion sensor 314. The functions of the vehicle 304, the display apparatus 306, the image capturing device 308, the display screen 310, and the first motion sensor 314 may be same as the functions of the vehicle 104, the display apparatus 102, the image capturing device 110, the display screen 106, and the first motion sensor 108 described, for example, in FIGS. 1-2.

Figure 5:
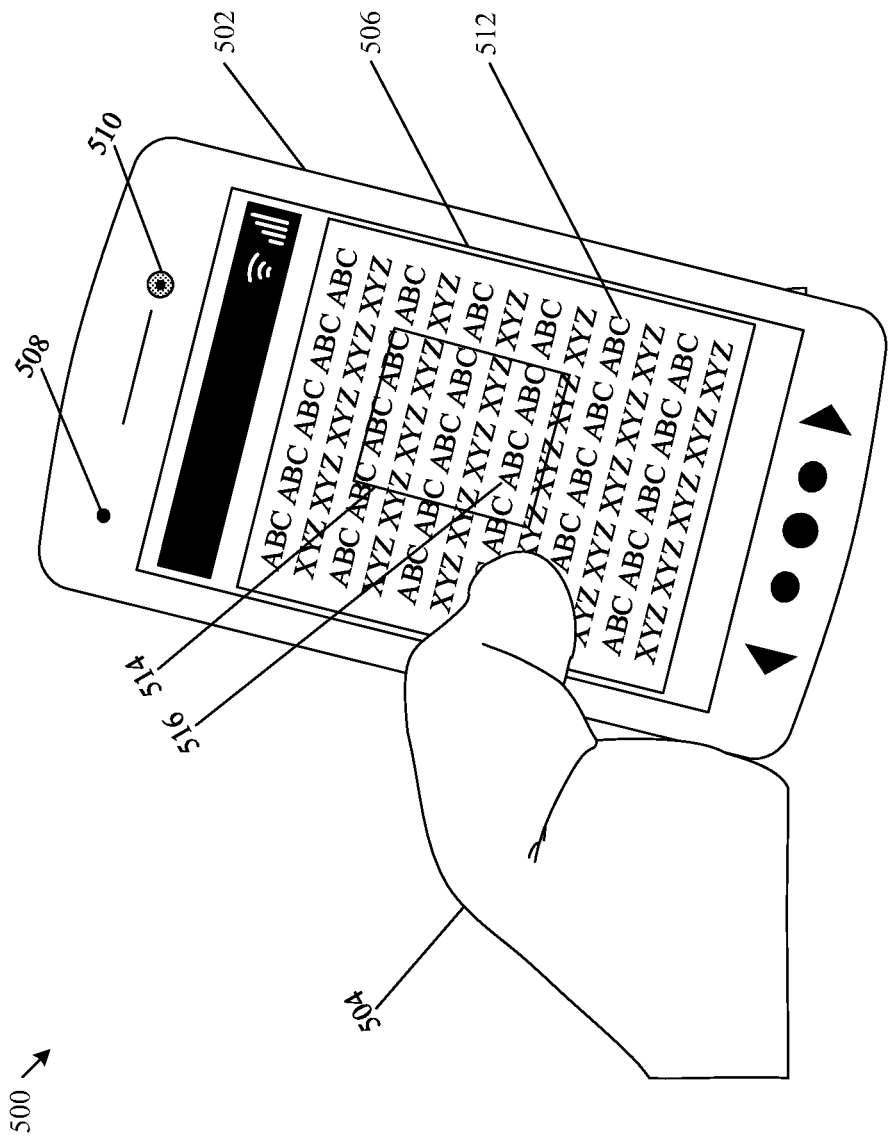
FIG. 5 is a diagram that illustrates an exemplary scenario for adjustment of content displayed on a mobile phone based on motion of a vehicle and an eye gaze of an occupant, in accordance with an embodiment of the disclosure.

The occupant 302 may be present in the vehicle 304 to reach a destination point. The occupant 302 may be driver or a passenger. As per FIG. 3, the occupant 302 corresponds the driver, however the occupant 302 may correspond to the passenger who may be sitting on a front seat or rear seat (not shown) of the vehicle 304, without deviation from the scope of the disclosure. During the travel to the destination point the display apparatus 306 may render the content 312 on the display screen 310 for the occupant 302. Examples of the content 312 may include, but are not limited to, a visual media content (such as images, movie), a text document, a multi-media content, map content, animated content, or gaming content. During the travel to the destination point, the vehicle 304 may experience motion and vibrations. For example, the route to the destination point may have bumps, dips, potholes, and/or turns that may constitute to the motion or vibration of the vehicle 304 or of the display apparatus 306 present in the vehicle 304. In certain scenarios, a particular acceleration, deacceleration, or applied brakes of the vehicle 104 may constitute regular or irregular motion or vibrations of the vehicle 304 or the display apparatus 306. In some embodiments, the vehicle 304 may encounter a linear motion, a rotatory motion or an oscillatory motion or vibrations. The encountered motion or vibrations with the display apparatus 306 (or with the handheld device held by the occupant 302 as shown in FIG. 5) may also create motion or vibrations of the content 312 displayed by the display screen 310.

In accordance with an embodiment, the first motion sensor 314 may be disposed on the display apparatus 306, as shown in FIG. 3. It may be noted here that the position or shape of the first motion sensor 314 shown in FIG. 3 is presented merely as an example. The present disclosure may be also applicable to other positions or shapes of the first motion sensor 314 disposed on the display apparatus 306, without deviation from the scope of the disclosure. In some embodiments, the first motion sensor 314 may be integrated in the display apparatus 306. The circuitry 202 may be configured to control the first motion sensor 314 to capture a first motion signal associated with the display apparatus 306. The first motion signal may indicate the motion or vibration encountered by the display apparatus 306. In some embodiments, the first motion signal may be captured in response to the detection of motion or vibration in the display apparatus 306 due to the movement of the vehicle 304.

In accordance with an embodiment, the vehicle 304 may include a second motion sensor (such as a second motion sensor 316 as shown in FIG. 3). The second motion sensor 316 may be disposed on an outer surface or an inner surface of the vehicle 304. It may be noted here that the position, arrangement, or shape of the second motion sensor 316 shown in FIG. 3 is presented merely as an example. The present disclosure may be also applicable to other positions, arrangement, or shapes of the second motion sensor 316 disposed on or within the vehicle 304, without deviation from the scope of the disclosure. The second motion sensor 316 may be configured to capture a second motion signal which may indicate motion or vibration encountered by the vehicle 304 during the movement of the vehicle 304. In an embodiment, the first motion sensor 314 and the second motion sensor 316 may be one of, but is not limited to, a tilt sensor, an accelerometer, a gyroscope sensor, or any other vibration sensing device. The circuitry 202 may control the second motion sensor 316 to capture the second motion signal in response to detection of the motion or vibration of the vehicle 304. The first motion signal and the second motion signal may include at least one of a first component for linear motion, a second component for rotatory motion, or a third component for oscillatory motion of the display apparatus 306 and the vehicle 304, respectively. In some embodiments, the first motion sensor 314 and the second motion sensor 316 may be configured to transmit the captured first motion signal and the captured second motion signal to the circuitry 202 of the display apparatus 306. In some embodiments, the first motion sensor 314 and the second motion sensor 316 may be similar to each other. In other embodiments, the first motion sensor 314 and the second motion sensor 316 may be different from each other and may provide different values of motion at same point.

The circuitry 202 of the display apparatus 306 may be configured to receive the first motion signal and the second motion signal from the first motion sensor 314 and the second motion sensor 316, respectively. The circuitry 202 may be further configured to control the image capturing device 308 to capture a first image of the occupant 302 of the vehicle 304. The image capturing device 308 may capture the first image of the occupant 302 based on a predefined field of view (FOV) of the image capturing device 308. The FOV of the image capturing device 308 may be predefined such that the first image of the occupant 302 (or image of a face of the occupant 302) may captured accurately. The image capturing device 308 may be disposed at a first side of the display apparatus 306. In one embodiment, the first side may correspond to a front side of the display apparatus 306 as shown, for example, in FIG. 3 so that the image capturing device 308 may clearly capture the first image of the face of the occupant 302. It may be noted here that locations or positions on the display apparatus 306 on which the image capturing device 308 is disposed, as shown in FIG. 3, is presented merely as an example. The image capturing device 308 may be disposed on other positions, location or surfaces of the display apparatus 306 without deviation from the scope of the disclosure, such that the FOV of the image capturing device 308 may capture the first image of the occupant 302 clearly. Other positions, locations, or surfaces of the display apparatus 306 at which the image capturing device 308 may be disposed are omitted from the disclosure for the sake of brevity. In some other embodiments, the image capturing device 308 may be disposed on an inner surface of the vehicle 304 (not shown in FIG. 3) to capture the first image of the face of the occupant 302.

The circuitry 202 of the display apparatus 306 may be further configured to extract an image portion from the captured first image of the face of the occupant 302. The image portion may indicate eyes of the face of the occupant 302. The circuitry 202 may extract the image portion (e.g. which may include sub-image or pixels for the eyes) from the captured first image based on different image processing techniques, known in the art. The circuitry 202 may be further configured to monitor the movement of the eyes of the occupant 302 based on the extracted image portion. In some embodiments, the circuitry 202 may control the image capturing device 308 over a period of time to capture multiple images of the face of the occupant 302 and further detect the movement of the eyes of the occupant 302 based on analysis of the image portion in each of the captured multiple images. The movement of the eyes may indicate where exactly the occupant 302 might be looking (for example towards the display apparatus 306 or anywhere else).

The circuitry 202 of the display apparatus 306 may be further configured to determine a region of an eye gaze of the occupant 302 on the display screen 310 based on the detected movement of the eyes of the occupant 302 (i.e. who might be watching on the display screen 310). In some embodiments, the circuitry 202 may determine the region (i.e. area of focus) of the eye gaze on the display screen 310 based on the captured first image. The determined region on the display screen 310 may include a portion of the content 312 displayed on the display screen 310. The circuitry 202 may be further configured to adjust the movement of the content 312 or the portion of the content 312 based on the captured first motion signal being higher than a predefined threshold The determined region of the eye gaze of the occupant 302 on the display screen 310, the portion of the displayed content 312, and the adjustment of the movement of the content 312 is described, for example, in FIGS. 4A and 4B.

Figure 4A:
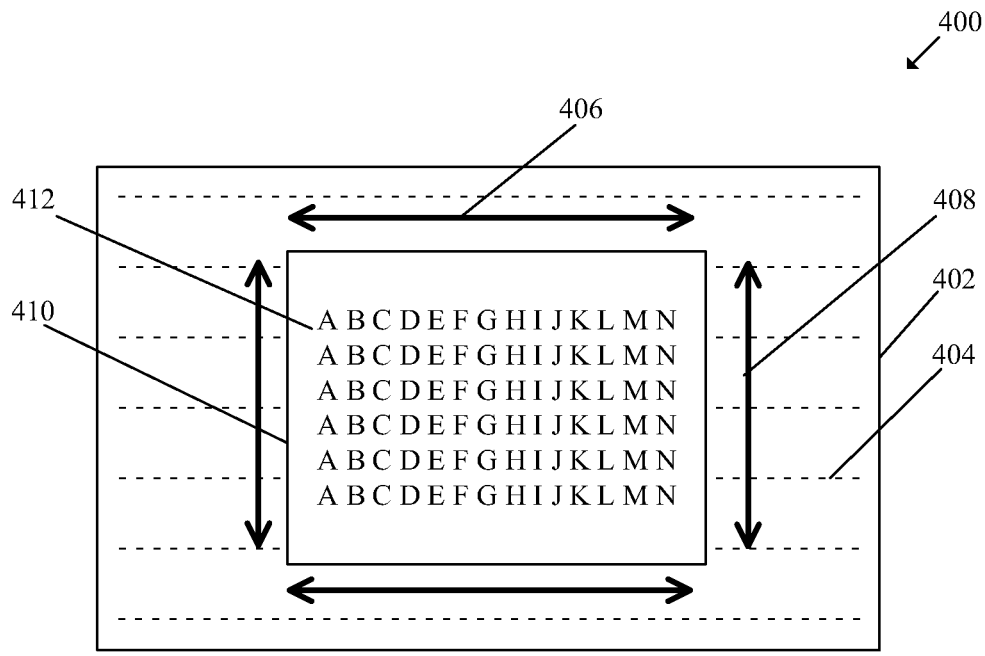
FIGS. 4A-4B are diagrams that collectively illustrates an exemplary display screen of the display apparatus of FIG. 2 for content adjustment based on the motion of the vehicle and the eye gaze of the occupant, in accordance with an embodiment of the disclosure.
Figure 4B:
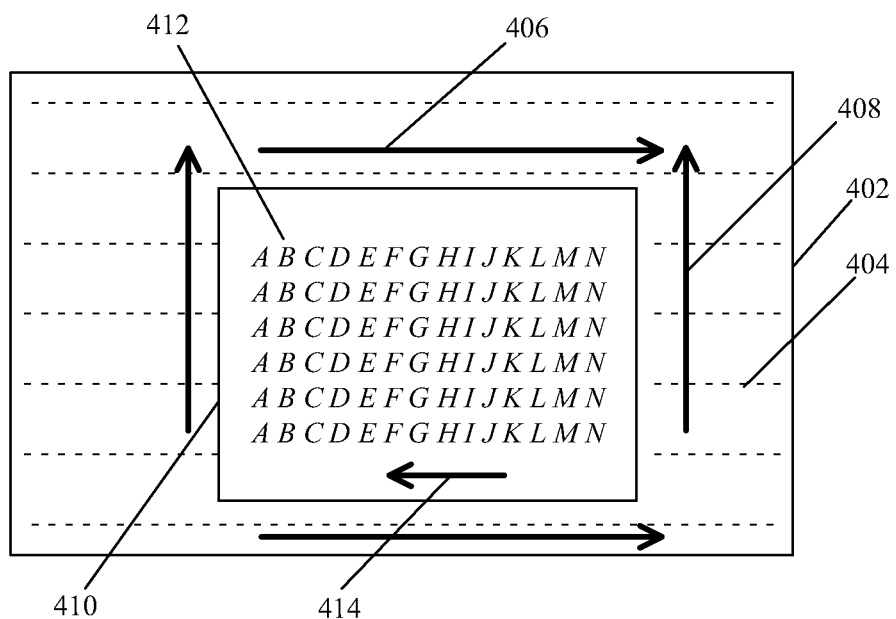

FIGS. 4A-4B are diagrams that collectively illustrates an exemplary display screen of the display apparatus of FIG. 2 for content adjustment based on motion of the vehicle and the eye gaze of the occupant, in accordance with an embodiment of the disclosure. FIGS. 4A-4B are explained in conjunction with elements from FIGS. 1, 2, and 3. With reference to FIGS. 4A and 4B, there is shown an exemplary scenario 400 in which there is shown a display screen 402 of the display apparatus 102 of FIG. 2 or the display apparatus 306 of FIG. 3. The display screen 402 may be similar to the display screen 310 in FIG. 3. The display screen 402 may be configured to display content 404 (i.e. similar to the content 312). In FIGS. 4A and 4B, the content 404 is represented, for example, as textual information (such as, but is not limited to, an e-book or a textual article).

As earlier described in FIG. 3, the circuitry 202 of the display apparatus 306 may be configured to control the first motion sensor 314 to capture the first motion signal which may indicate the motion or vibration of the display apparatus 306 caused due to the regular or irregular movement of the vehicle 304. The captured first motion signal may include, for example, at least one of a first component for linear motion, a second component for rotatory motion, or a third component for oscillatory motion of the display apparatus 306 or the vehicle 304. In the exemplary scenario 400, the first component for the linear motion has been considered (for example) to explain the motion or vibration of the display apparatus 306. In an embodiment, the first component for the linear motion may further include a horizontal motion component 406 and a vertical motion component 408. The horizontal motion component 406 may indicate the motion or vibration in the horizontal (Y-axis) direction, and the vertical motion component 408 may indicate the motion or vibration in the vertical direction (X-axis) of the display apparatus 306 as shown in FIGS. 4A and 4B. The direction of the horizontal motion component 406 and the vertical motion component 408 may correspond to the direction of the motion or vibration of the vehicle 304. For example, the horizontal motion component 406 and the vertical motion component 408 may indicate extent of the motion/vibration in various units of lengths or distances, such as, in micrometer (um), in millimeter (mm), or in centimeter (cm). The circuitry 202 may be configured to determine the direction and the extent (length) of the motion/vibration from the received first motion signal captured from the first motion sensor 314. For example, as per FIG. 4B, there is shown a motion or movement of the display apparatus 306 in a right direction as indicated by the horizontal motion component 406. As described in FIG. 3, the circuitry 202 may be further configured to control the image capturing device 308 to capture the first image of the occupant 302 in the vehicle 304 and further determine a region (such as region 410 in FIGS. 4A and 4B) of the eye gaze of the occupant 302 on the display screen 402 based on the captured first image or based on the detected movement of the eyes of the occupant 302. The determined region 410 on the display screen 402 may indicate where exactly the occupant 302 may be looking or focusing on the content 404 displayed on the display screen 402 at a particular time instance. The determined region 410 on the display screen 402 may include a portion (such as portion 412) or part of the displayed content 404. In some embodiments, the portion 412 may be complete content 404 displayed on the display screen 402. For example, the portion 412 may indicate complete image of the displayed content 404.

The circuitry 202 of the display apparatus 306 may be configured to compare the captured first motion signal with a first predefined threshold related to motion or vibration. The first predefined threshold may indicate a value of motion or vibration (for example in micrometer, millimeter, or centimeter) till which the corresponding motion (or vibration) of the display apparatus 306 may not cause the motion/vibration to the content 404 displayed on the display screen 402 and the occupant 302 may not feel motion sickness while looking the content 404. In case, the captured first motion signal is less than or equal to the first predefined threshold, the circuitry 202 may not adjust the content 404 displayed on the display screen 402. In case, the first motion signal is higher than the first predefined threshold, the circuitry 202 may be configured to adjust a movement or motion of the portion 412 (i.e. where the occupant 302 may be looking or focusing) of the displayed content 404 based on the captured first motion signal. In some embodiments, the circuitry 202 may adjust the movement of the complete displayed content 404. The circuitry 202 may be further configured to stabilize a display position of the portion 412 on the display screen 402 to adjust the movement or motion of the portion 412 of the displayed content 404. The display position may be an area (i.e. focus point or focus area where the occupant 302 may be looking) of the display screen 402 where the portion 412 of the content 404 is displayed. In some embodiments, the circuitry 202 may stabilize the movement or motion of the region 410 of the eye gaze of the occupant 302 on the display screen 402. For example, to adjust the movement of the portion 412, the circuitry 202 may be configured to shift the portion 412 of the displayed content 404 in left-right directions and/or in up-downward directions (as shown in FIGS. 4A and 4B) based on the horizontal motion component 406 and/or the vertical motion component 408 of the first component of the linear motion, indicated by the first motion signal. In some embodiments, the circuitry 202 may be configured to adjust the movement of whole displayed content 404 based on the captured first motion signal being higher than the first predefined threshold. The adjustment or stabilization of the displayed content 404 or the portion 412 of the content 404 based on real-time measurement of the first motion signal may prevent motion sickness of the occupant 302 that may be caused due to the motion or vibration of the display apparatus 306 or the vehicle 304 on real-time basis.

In some embodiments, the memory 204 of the display apparatus 306 may be further configured to store an association between the captured first motion signal and a degree of adjustment of the movement of the portion 412 of the displayed content 404. The association may be stored in the form of a data structure such as a table (for example a lookup table). Examples of degree of adjustments for the content for different values of motion signal (for example linear motion) are presented in Table 1, as follows:

TABLE 1

| Value of Motion signal with linear motion component | Degree of adjustment of content |
|---|---|
| 1 mm (right) | 1 mm (left) |
| 1 mm (left) | 1 mm (right) |
| 1 mm (up) | 1 mm (down) |
| 1 mm (down) | 1 mm (up) |

As per Table 1, the circuitry 202 may determine the value of motion or vibration from the captured first motion signal and retrieve the corresponding degree of adjustment for the content 404 from the memory 204. For example, for the +1 mm motion/vibration of the display apparatus 306 in the right direction (i.e. as shown by the horizontal motion component 406 in FIG. 4B) over a defined time-period, the circuitry 202 may move (or adjust) the content 404 by 1 mm distance in the left direction (as shown by a reverse movement 414 in FIG. 4B) on real-time, based on the stored association in the memory 204 such that the displayed content 404 seems stabilized even though the display apparatus 306 experiences motion or vibration due to the movement (or bumps, dips, turns, potholes, applied brakes) of the vehicle 304. Similarly, the circuitry 202 may determine the value the vertical motion component 408 based on the captured first motion signal and accordingly adjust the motion of the displayed content 404 based on the stored associated in the memory 204.

In accordance with an embodiment, the memory 204 of the display apparatus 306 may be configured to store associations between the captured first motion signal and degree of adjustments of the movement of the portion 412 where the first motion signal may have components of the rotatory motion (i.e. defined by change in angle of the display apparatus 306) and/or the oscillatory motion (i.e. defined by change in linear distance or angle). For example, for a rotatory motion of 1 degree, say in clock-wise direction of the display apparatus 306, the circuitry may move the portion 412 or the content by 1 degree (i.e. degree of adjustment) in an opposite direction (i.e. anti-clock direction). The details of the association between the rotatory or the oscillatory motion (indicated by the first motion signal) and the degree of adjustment of the displayed content 404 have been omitted from the disclosure for the sake of brevity.

In some embodiments, the circuitry 202 of the display apparatus 306 may be configured to adjust the movement of the portion 412 of the displayed content 404 in real time based on the real-time measurement of the motion of the display apparatus 306. In some embodiments, the circuitry 202 may be further configured to predict the adjustment the movement of the portion 412 of the displayed content 404 before the actual detection of the motion or vibration of the display apparatus 306. The prediction of the adjustment of the content 404 may be based on the stored machine learning model 204A. The details of the prediction and the machine learning model 204A is described in detail, for example, in FIG. 6.

In accordance with an embodiment, the circuitry 202 may be configured to control the second motion sensor 316 to capture the second motion signal which may indicate the motion or vibration of the vehicle 304 during the travel. The circuitry 202 may be further configured to adjust the movement or motion of the portion 412 of the displayed content 404 based on the combination of the captured first motion signal (i.e. indicate motion of the display apparatus 306) and the captured second motion signal (i.e. indicate the motion of the vehicle 304) being higher than a second predefined threshold which may be higher or equal to the first predefined threshold. In some embodiments, the circuitry 202 of the display apparatus 306 may be configured to calculate average of the captured first motion signal and the captured second motion signal and adjust the movement of the portion 412 of the displayed content 404 based on the calculated average of the captured first motion signal and the captured second motion signal such that both the motion of the display apparatus 306 and the motion of the vehicle 304 are considered for the adjustment of the movement of the content 404. The average of the first motion signal and the second motion signal may provide higher accuracy in the motion detection and further adjustment of the content 404. In some embodiments, the first predefined threshold and the second predefined threshold may be same. Thus, the circuitry 202 may adjust the movement of the portion 412 when the combination of the first motion signal and the second motion is higher than the first predefined threshold. Hence, even if the captured first motion signal does not indicate the motion or vibration of the display apparatus 306 in certain situations, still the capture of the second motion signal of the vehicle 304 may allow the adjustment of the portion 412 of the content 404. The combination of the motion signals may enhance the accuracy the detection of motion or vibration, and the adjustment of the displayed content 404 accordingly.

In accordance with an embodiment, the circuitry 202 of the display apparatus 306 may be configured to detect a movement of a body part (such as head) of the occupant 302 based on the captured first image of the occupant 302 and adjust the movement of the portion 412 of the displayed content 404 based on the captured first motion signal and the detected movement of the body part of the occupant 302. The circuitry 202 may detect the movement of the body parts to determine whether the movement or motion of the body parts (such as the head) is due to the motion or vibration caused by the vehicle 104 or done intentionally by the occupant 302. For example, while looking the content 404, the occupant 302 may be moving his/her head intentionally to a larger extent that may be significantly larger than the motion of the display apparatus 306 as detected by the first motion signal or the second motion signal. In an example, the circuitry 202 may determine that the motion or vibration of the display apparatus 306 is 10 mm in right direction based on the horizontal motion component 406 in the first motion signal and determine that the movement of the head is in inches (in) based on the captured first image (or multiple images captured over a time). Thus, based on the first predefined threshold (say 1 mm for example), the circuitry 202 may determine that the determined movement of the body part (i.e. head intentionally moved by the occupant 302) is significantly higher than the first predefined threshold and further ignore the intentional movement of the body part to adjust (or stabilize) the content 404 based on the determined movement of the body part (i.e. head). In such case, the circuitry may only adjust the content 404 or the portion 412 only based on the first motion signal and/or the second motion signal. In some embodiments, the display apparatus 306 may store another predefined threshold related to the motion of the body part (i.e. head) in the memory 204, and accordingly ignore the adjustment of the content 404 or the portion 412 based on the other predefined threshold related to the motion of the body part. For example, in case the movement the body part (i.e. head) is by 3 inches detected based on the first image and the other predefined threshold related to the motion of the body part is 1 centimeter (cm), then the circuitry 202 may ignore the adjustment of the content 404 because the intentional motion of the body part is significantly higher than the other predefined threshold related to the motion of the body part. Similarly, the circuitry 202 may detect the movement of a hand (i.e. the body part) of the occupant 302 based on the captured images of the hand, and determine the related intentional movement (i.e. occupant waving his/her hand) to ignore the adjustment of the displayed content 404 on the display apparatus 306, considering the display apparatus 306 is a handheld device (such as a mobile phone 502 shown in FIG. 5) held by the occupant 302 while travelling in the vehicle 304.

FIG. 5 is a diagram that illustrates an exemplary scenario for adjustment of content displayed on a mobile phone based on motion of a vehicle and an eye gaze of an occupant, in accordance with an embodiment of the disclosure. FIG. 5 is explained in conjunction with elements from FIGS. 1, 2, 3, and 4. With reference to FIG. 5, there is shown an exemplary scenario 500. With reference to FIG. 5, in the exemplary scenario 500, there is shown a mobile phone 502. The mobile phone 502 may be used by an occupant (such as the occupant 302) in the vehicle 304 (shown in FIG. 3) during the travel to a destination point. The mobile phone 502 may be held in a hand 504 of the occupant 302 (not shown in FIG. 5). The mobile phone 502 may include a display screen 506, at least one first motion sensor 508, and an image capturing device 510. The mobile phone 502 may also include circuitry (not shown) that may be coupled with the display screen 506, the at least one first motion sensor 508, and the image capturing device 510. The circuitry may be configured to adjust the movement of content 512 being displayed on the display screen 506 in response to the motion of the vehicle 304 in which the occupant 302 may be present and may be using the mobile phone 502. The functions of the display screen 506, the first motion sensor 508, and the image capturing device 510 may be same as the functions of the display screen 310, the first motion sensor 314, and the image capturing device 308, respectively as described, for example, in FIG. 3. Similarly, the functions of the circuitry of the mobile phone 502 may be similar to the function of the circuitry 202 of the display apparatus 306 as described, for example, in FIGS. 3-4.

The circuitry may be configured to control the first motion sensor 508 to capture a first motion signal associated with the mobile phone 502, where the first motion signal may indicate motion or vibration of the mobile phone 502 which may be caused due to the movement or motion of the vehicle 304. The first motion signal associated with the mobile phone 502 may be similar to the first motion signal associated with the display apparatus 306 as described, for example, in FIGS. 3-4. Thus, the description of the first motion signal associated with the mobile phone 502 is omitted from the disclosure for the sake of brevity. In some embodiments, the circuitry may be further configured to control at least one second motion sensor (not shown) to capture the second motion signal to indicate the motion or vibration of the vehicle 304 as described, for example, in FIGS. 3-4. The first motion sensor 508 and the second motion sensor in the vehicle 304 may include at least one of a tilt sensor, an accelerometer, a gyroscope sensor, or motion/vibration sensing device.

The circuitry may be further configured to control the image capturing device 510 (i.e. disposed at a first side of the mobile phone 502) to capture the first image (or image of a face) of the occupant 302 present in the vehicle 304 and using the mobile phone 502. The circuitry may be further configured to determine a region (such as region 514 in FIG. 5) of an eye gaze of the occupant 302 on the display screen 506 based on the captured first image as described, for example, in FIGS. 3-4. The region 514 may an area (i.e. focus area) on the display screen 506 on which the occupant 302 may be looking or focusing during the travel through the vehicle 304. The determined region 514 on the display screen 506 may include a portion (such as a portion 516 in FIG. 5) of the displayed content 512. In accordance with an embodiment, the circuitry may be further configured to adjust (or stabilize) a movement of the portion 516 of the displayed content 512 (or the movement of the complete content 512) based on the captured first motion signal, the second motion signal or the combination being higher than the first predefined threshold as described, for example, in FIGS. 3-4. Thus, during the travel in the vehicle 304, the circuitry of the mobile phone 502 may determine the region 514, where the eye gaze of the occupant 302 is looking or focused, and further adjust the movement of the region 514 or the portion 516 based on the motion/vibration of the mobile phone 502 indicated by the first motion signal or the motion/vibration of the vehicle 304 indicated by the second motion signal.

Figure 6:
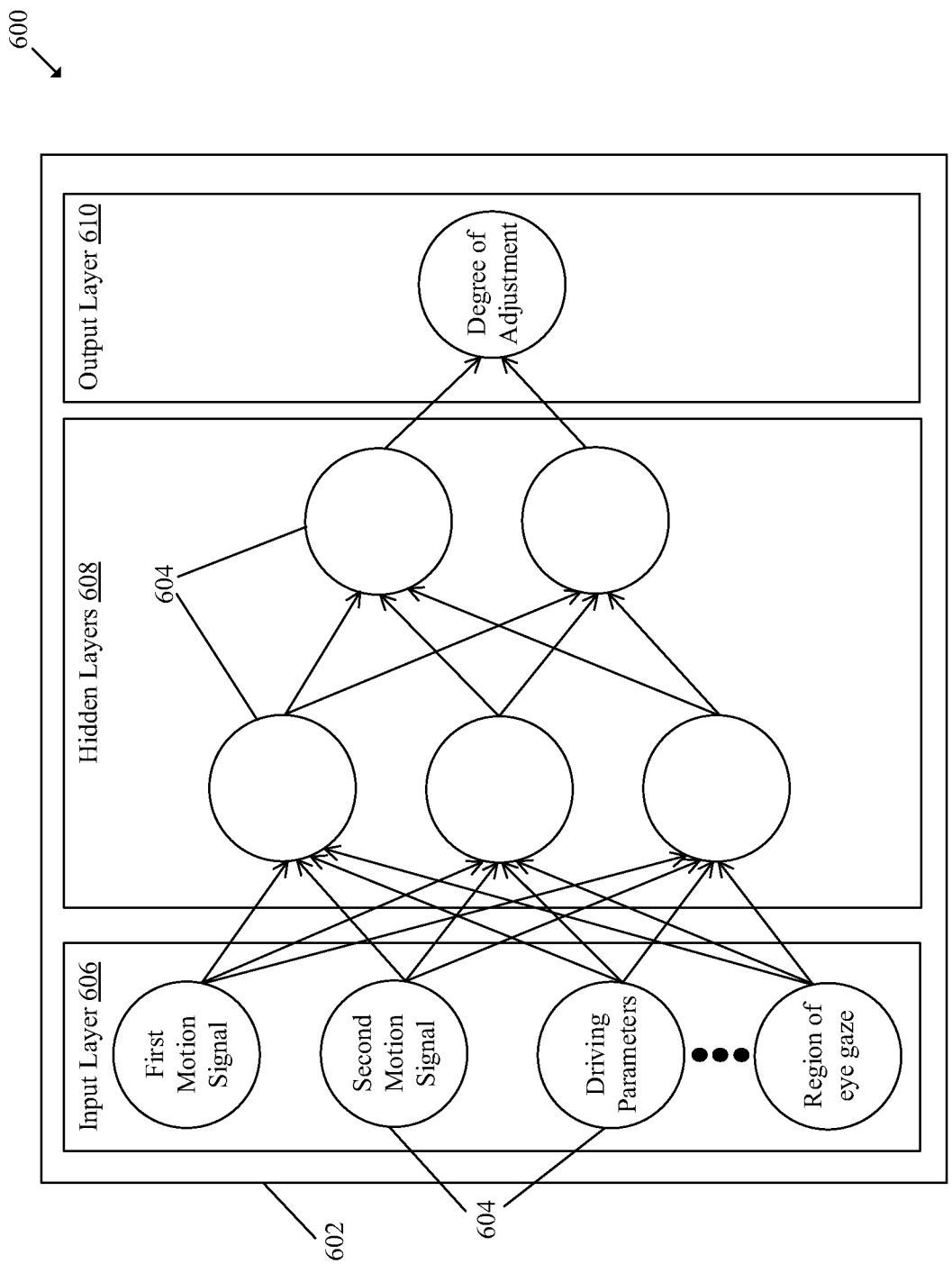
FIG. 6 is a diagram that illustrates an exemplary machine learning (ML) model for content adjustment based on motion of the vehicle, a set of driving parameters, and an eye gaze of an occupant, in accordance with an embodiment of the disclosure.

FIG. 6 is a diagram that illustrates an exemplary machine learning (ML) model for content adjustment based on motion of the vehicle, a set of driving parameters, and eye gaze of occupant, in accordance with an embodiment of the disclosure. FIG. 6 is explained in conjunction with elements from FIGS. 1, 2, 3, 4, and 5. With reference to FIG. 6, there is shown a block diagram 600 of exemplary machine learning (ML) model for adjustment of content based on the motion of the vehicle 304, a set of driving parameters, and an eye gaze of occupant.

In FIG. 6, there is shown a neural network model 602 as the machine learning (ML) model (such as the machine learning model 204A shown in FIGS. 1-2). The neural network model 602 may be a classifier/regression/clustering model which may be trained to identify a relationship between inputs, such as features in a training dataset and output labels. The neural network model 602 model may be defined by its hyper-parameters, for example, number of weights, cost function, input size, number of layers, and the like. The hyper-parameters of the neural network model 602 may be tuned, and weights may be updated so as to move towards a minimum of a cost function for the neural network model 602. After several epochs of the training on the feature information in the training dataset, the neural network model 602 may be trained to output a prediction/classification result for a set of inputs. The prediction result may be indicative of a degree of adjustment for the displayed content (such as the content 404 in FIG. 4).

The neural network model 602 may include electronic data, such as, for example, a software program, code of the software program, libraries, applications, scripts, or other logic or instructions for execution by a processing device, such as circuitry 202 of the display apparatus 306 or the circuitry of the mobile phone 502. Additionally, or alternatively, the neural network model 602 may be implemented using hardware including a processor, a microprocessor (e.g., to perform or control performance of one or more operations), a field-programmable gate array (FPGA), or an application-specific integrated circuit (ASIC). Alternatively, in some embodiments, the neural network model 602 may be implemented using a combination of hardware and software.

In some embodiments, the neural network model 602 may be referred to as a computational neural network or a system of artificial neurons, where each layer of the neural network model 602 may include artificial neurons as nodes 604. The neural network model 602 may contain an input layer 606, one or more hidden layers 608, and an output layer 610 as shown in FIG. 6. Outputs of all the nodes 604 in the neural network model 602 may be coupled to at least one node of preceding or succeeding layer(s) of the neural network model 602. Similarly, inputs of all the nodes 604 in the neural network model 602 may be coupled to at least one node of preceding or succeeding layer(s) of the neural network model 602. Node(s) in a final layer 610 of the neural network model 602 may receive inputs from at least one previous layer (such as hidden layer) 608. A number of layers and a number of nodes in each layer may be determined from a network topology and certain hyper-parameters of the neural network model 602. Such hyper-parameters may be set before or while training the neural network model 602 on the training dataset.

Each node 604 in the neural network model 602 may correspond to a mathematical function with a set of parameters, tunable while the neural network model 602 is trained. These parameters may include, for example, a weight parameter, a regularization parameter, and the like. Each node 604 may use the mathematical function to compute an output based on one or more inputs from nodes in other layer(s) (e.g., previous layer(s)) of the neural network model 602. Examples of the neural network model 602 may include, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), (You Only Look Once) YOLO network, a Long Short Term Memory (LSTM) network based RNN, CNN+ANN, LSTM+ANN, a gated recurrent unit (GRU)-based RNN, a fully connected neural network, a Connectionist Temporal Classification (CTC) based RNN, a deep Bayesian neural network, a Generative Adversarial Network (GAN), and/or a combination of such networks. In certain embodiments, the neural network model 602 may be based on a hybrid architecture of multiple Deep Neural Networks (DNNs).

In some embodiments, the display apparatus 306 may be configured to store the neural network model 602 (such as the machine learning model 204A) in the memory 204. The neural network model 602 may be a pre-trained model. The neural network model 602 may be trained based on a set of driving parameters. Examples of the set of driving parameters may include, but are not limited to, speed information of the vehicle 304, past motion information of a route taken by the vehicle 304, or driving pattern information of an occupant (such as the occupant 302) of the vehicle 304. As shown in FIG. 6, the neural network model 602 may be trained based on the set of driving parameters and motion information to determine (or output) degree of adjustments to further adjust or stabilize content (such as the content 404) displayed on the display screen 402. The motion information may indicate different values of linear, rotatory or oscillatory components of the motions (as the training dataset) on which the neural network model 602 may be trained to output the corresponding degree of adjustment as described, for example, in Table 1 (i.e. at least for linear component of motion). Similarly, the set of parameters may include different values or data associated with each parameter on which the neural network model 602 may be trained to output the corresponding degree of adjustment. For example, for the speed information as one of the set of driving parameters, the neural network model 602 may be trained on different values (in meter/sec or Km/hour) of the speed of the vehicle 304 as the training dataset, to output the corresponding degree of adjustment for the content 404. In another example, the past motion information (as one of the set of driving parameters) of the route may indicate different past routes and/or existing motion/vibration points (such as bump, turns, potholes) situated on the past routes. The neural network model 602 may be trained on the different routes and/or existing motion/vibration points as the training dataset, and output or predict corresponding degree of adjustments for the motion/vibration points on different routes. The neural network model may store a GPS coordinate for each motion/vibration points on the route. In another example, the driving pattern information of the occupant 302 may indicate the driving behavior of the occupant 302. The neural network model 602 may be trained on different types of driving behaviors (for example, but not limited to, learner, experienced, soft driving behavior, or rough driving behavior) as the training dataset, to output the corresponding degree of adjustment for the adjustment of the content 404. In some embodiments, the neural network model 602 may be trained on the combination of the motion information and the set of driving parameters to determine the corresponding degree of adjustments for each combination.

In accordance with an embodiment, the circuitry 202 of the display apparatus 306 may be configured to control the at least one first motion sensor 314 to capture the first motion signal associated with the display apparatus 306 as described, for example, in FIGS. 3-4. The first motion signal may indicate one of the values of the motion information (or vibration) on which the neural network model 602 may be trained. The circuitry 202 of the display apparatus 306 may be further configured to retrieve one or more first driving parameters associated with one of the vehicle 304 or the occupant 302 present in the vehicle 304. In some embodiments, the occupant 302 present in the vehicle 304 may be driver of the vehicle 304. The one or more first driving parameters associated with the vehicle 304 may include one of the values of the speed information of the vehicle 304 on which the neural network model 602 is trained to determine the corresponding degree of adjustment based on a particular value of the speed of the vehicle 304. In some embodiments, the circuitry 202 may be configured to control the speed sensor 212 to determine or retrieve current speed of the vehicle 304 as one the values of the speed information. In another embodiment, the one or more first driving parameters associated with the vehicle 304 may include a current route followed by the vehicle 304 to reach to the destination point. The circuitry 202 may be configured to control the geolocation sensor 214 to capture current GPS coordinates of the vehicle 304. The circuitry 202 may extract prestored map data and associate various GPS coordinates (i.e. provided by the geolocation sensor 214) to determine or retrieve the current route (i.e. navigation information) followed by the vehicle 304 to reach a particular destination point. In an embodiment, the current route may be received from the server 114 based on a starting point and the destination point of the travel of the vehicle 304. The determined current route (as one of the first driving parameter) may be one of the past routes (i.e. past motion information associated with the vehicle 304) on which the neural network model 602 may be trained to determine or predict the corresponding degree of adjustments for a particular route which may include various bumps, potholes or turns (or other road conditions) to generate motion or vibrations for the vehicle 304.

In an embodiment, the one or more first driving parameters associated with the occupant 302 may indicate a driving behavior of the occupant 302 (i.e. current driver) of the vehicle 304. The circuitry 202 may be configured to recognize the occupant 302 from the capture first image based on face recognition techniques, and identify or retrieve driver profile information associated with the recognized occupant 302, where the driver profile information may indicate the driving behavior (i.e. learning behavior, experienced driving behavior, soft driving behavior, or rough driving behavior). In some embodiments, the circuitry 202 may retrieve the driving behavior of the currently recognized occupant 302 from the server or from the memory 204. The driving behavior of the current occupant 302 (as the driver) may be one of the driving behaviors (i.e. driving pattern information) on which the neural network model 602 may be trained to determine the corresponding degree of adjustment for a particular driving behavior.

In accordance with an embodiment, the circuitry 202 of the display apparatus 306 may be further configured to apply the trained neural network model 602 on the captured first motion signal (i.e. one of the value of the motion information) and/or on the retrieved one or more first driving parameters (i.e. speed, current route, or driving behavior of the occupant 302) to determine a first degree of adjustment (or multiple degree of adjustments for multiple vibration points in a route) for the displayed content 312. In other words, the captured first motion signal and the retrieved one or more first driving parameters may be input at the input layer 606 of the trained neural network model 602 to determine the first degree of adjustment at the output layer 610 corresponding to the input first motion signal and the retrieved one or more first driving parameters. The circuitry 202 of the display apparatus 306 may be further configured to adjust the movement of the displayed content 312 on the display screen 310 based on the determined first degree of adjustment from the output layer 610 of the trained neural network model 602.

For example, in case, the first motion signal (i.e. captured from the first motion sensor 314) indicate that the linear motion is of 1 mm in the right direction, then the trained neural network model 602 (i.e. trained based on Table 1) may determine the degree of adjustment as 1 mm in the left direction based on the first motion signal input to the trained neural network model 602. The circuitry 202 may further adjust the content 312 to 1 mm in the left direction based on the determined degree of adjustment output from the neural network model 602. In another example, in case, the speed of the vehicle 304 (as one of the first driving parameter) retrieved from the speed sensor 212 is high (for example 90 mph), then the trained neural network model 602 may provide a higher value of the degree of adjustment to stabilize the movement of the content 404, considering a situation that at a higher speed, the vehicle 304 passing through bumps (or potholes) may experience higher value of motion or vibration in the captured first motion signal. Similarly, at a lower speed (for example 10 mph), the motion or vibration captured by the first motion signal may be of a lower value, and therefore the trained neural network model 602 or the circuitry 202 may determine a lower value of degree of adjustment for the content 404 based on the low speed captured by the speed sensor 212. Thus, the circuitry 202 may adjust or stabilize the movement of the content 404 based on the combination of the speed information and the captured first motion signal.

In another example, in case, the retrieved driving behavior (as one of the first driving parameter) of the occupant 302 indicates that the occupant 302 is a learner (or a rough driver or has the learning behavior), then the trained neural network model 602 may provide a higher value of the degree of adjustment considering that the vehicle 304 (i.e. with a driver as the learner) may experience higher value of motion or vibration (i.e. captured by the first motion signal), as compared to another occupant who has an experienced driving behavior (or may be with smooth driving behavior). Thus, the circuitry 202 may adjust or stabilize the movement of the content 404 based on the degree of adjustment output by the trained neural network model 602 which may be applied on the first motion signal and/or the driving pattern information.

In another example, in case, the identified current route followed by the vehicle 304 is a particular route, then the circuitry 202 may input the identified current route (as one of the first driving parameters) to the input layer 606 of the neural network model 602. The identified current route of the vehicle 304 may be indicated as the navigation information (i.e. sequence of GPS coordinates) from the geolocation sensor 214. The circuitry 202 may apply the trained neural network model 602 on the current route to determine or predict the degree of adjustments (as the output) for the different motion or vibration points (such as bump, turns, or potholes) situated on the current route followed by the vehicle 304. The neural network model 602 may be trained on the different motion or vibration points (i.e. past motion information) of various routes (including the current route). Thus, based on the identified motion or vibration points (such as bump, turns, or potholes) of the current route and the corresponding degree of adjustments output from the neural network model 602, the circuitry 202 may predict or know the approaching motion or vibration points (for example approaching bumps or turns on the route) and accordingly apply the degree of adjustments on the displayed content 312 based on the first motion signal for each motion or vibration points. In some embodiments, the memory 204 or the neural network model 602 may store the linear, rotatory, or oscillatory component values of motion for each motion or vibration points of the particular route. For example, the memory 204 may store the horizontal or vertical motion components of a particular bump approaching on the route. The circuitry 202 may further adjust the content 312 (say few millisecond) before the vehicle 304 actually experience the motion or vibration at a particular motion or vibration points (i.e. bump, turn, or potholes) on the route.

In some other embodiments, the circuitry 202 of the display apparatus 306 may be further configured to control the image capturing device 308 to capture the first image of the occupant 302 present in the vehicle 304. The circuitry 202 may be further configured to determine the region 410 of the eye gaze of the occupant 302 on the display screen 402 based on the captured first image as described, for example, in FIGS. 3-4. In some embodiments, the circuitry 202 may be configured to input the determined region 410 on the display screen 402 to the input layer 606 of the neural network model 602 as shown in FIG. 6. The neural network model 602 may be trained on different regions of the display screen 402. The circuitry 202 may be configured to apply the trained neural network model 602 on the determined region 410 to determine a corresponding degree of adjustment for the determined region 410. For example, for a center region of the display screen 402, the degree of adjustment for the portion 412 displayed on the center region may be higher or accurate as compared to corner regions on the display screen 402. In some embodiments, the circuitry 202 may be configured to adjust the movement or vibration of the content 404 (or the portion 412 in the region 410 which is determined from the eye gaze of the occupant 302) based on the determined first degree of adjustment output from the trained neural network model 602.

In accordance with an embodiment, the circuitry 202 of the display apparatus 306 may be further configured to re-train the neural network model 602 based on a second driving parameter that were excluded from the set of driving parameters on which the neural network model 602 was previously trained. The second driving parameter may be a new driving parameter (for example newly measured speed of the vehicle 304, new driving behavior of the occupant 302 or new route followed by the vehicle 304) on which the neural network model 602 may not be trained earlier to output the corresponding degree of adjustment for the stabilization of the content 404. The circuitry 202 may be configured to determine a second degree of adjustment for the content 404 based on the determined second driving parameter. The circuitry 202 of the display apparatus 306 may be further configured to re-train the neural network model 602 based on the second driving parameter (or the modified set of driving parameters) and the second degree of adjustment corresponding to the second driving parameter. Thus, based on the re-training, the neural network model 602 or the disclosed display apparatus 306 may provide enhanced accuracy of the motion stabilization for the modified set of driving parameters (for example different speeds of vehicle, different driving behaviors of occupants or different routes followed by the vehicle).

In accordance with an embodiment, the circuitry 202 of the display apparatus 306 may be configured to capture another motion signal (different from the first motion signal) from the at least first motion sensor 314. The other motion signal may indicate a motion or vibration value that may be excluded from the motion information on which the neural network model 602 is trained. In other words, the other motion signal may a motion or vibration value on which the neural network model 602 is not trained to provide a corresponding degree of adjustment for the content 404 or the portion 412. The circuitry 202 of the display apparatus 306 may be further configured to determine a second degree of adjustment for the displayed content 404 based on the captured other motion signal. The circuitry 202 may be further configured to re-train the neural network model 602 based on the determined second degree of adjustment for the captured other motion signal. The circuitry 202 may be further configured to adjust or stabilize the movement of the displayed content 404 on the display screen 402 based on the determined second degree of adjustment corresponding to the other motion signal (i.e. new value of capture motion or vibration).

Figure 7:
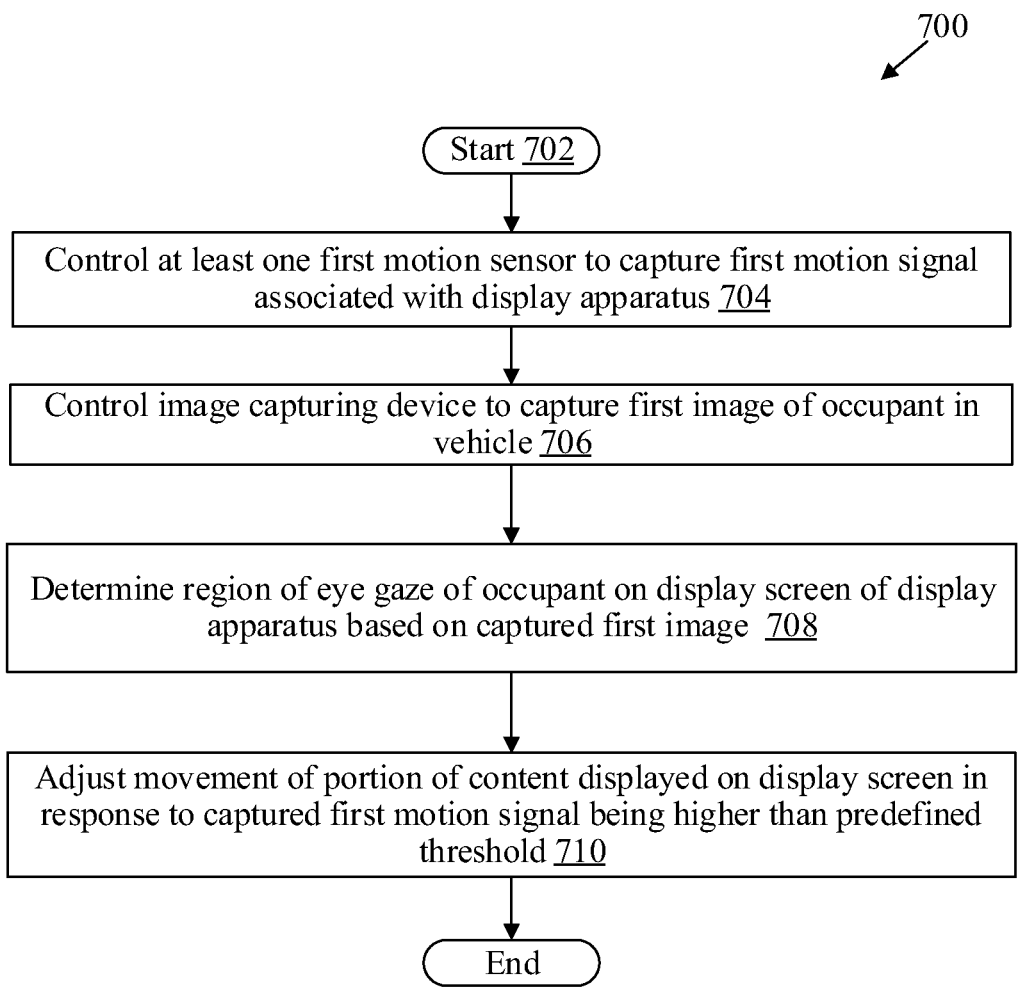
FIG. 7 is a flowchart that illustrates exemplary operations for content adjustment based on vehicle motion and the eye gaze of the occupant, in accordance with an embodiment of the disclosure.

FIG. 7 is a flowchart that illustrates exemplary operations for content adjustment based on vehicle motion and an eye gaze of an occupant, in accordance with an embodiment of the disclosure. With reference to FIG. 7, there is shown a flowchart 700. The flowchart 700 is described in conjunction with FIGS. 1, 2, 3, 4, 5, and 6. The operations from 702 to 710 may be implemented, for example, by the display apparatus 102, the display apparatus 306, the circuitry 202 or the mobile phone 502 of FIGS. 1, 3, and 5. The operations of the flowchart 700 may start at 702 and proceed to 704.

At 704, at least one first motion sensor 108 may be controlled to capture a first motion signal associated with the display apparatus 102. In accordance with an embodiment, the display apparatus 102 or the circuitry 202 may be configured to control the at least one first motion sensor 108 to capture the first motion signal associated with display apparatus 102 as described, for example, in FIGS. 1 and 3.

At 706, an image capturing device 110 may be controlled to capture a first image of an occupant 118 in the vehicle 104. In accordance with an embodiment, the display apparatus 102 or the circuitry 202 may be configured to control the image capturing device 110 to capture the first image of the occupant 118 (i.e. driver or passenger) present in the vehicle 104 as described, for example, in FIGS. 1 and 3.

At 708, a region of an eye gaze of the occupant 118 on the display screen 106 may be determined. The region (for example the region 410) of the eye gaze of the occupant 118 on the display screen 106 or the display screen 402 may be determined based on the captured first image of the occupant 118 (or the occupant 302 of FIG. 3). The determined region on the display screen 106 may include a portion (such as the portion 412) of the displayed content 120 (or the content 404). In accordance with an embodiment, the display apparatus 102 or the circuitry 202 may be configured to determine the region of the eye gaze of the occupant 118 on the display screen 106 based on the captured first image where the determined region on the display screen 106 include the portion of displayed content 120 as described, for example, in FIGS. 1, 3, and 4.

Figure 8:
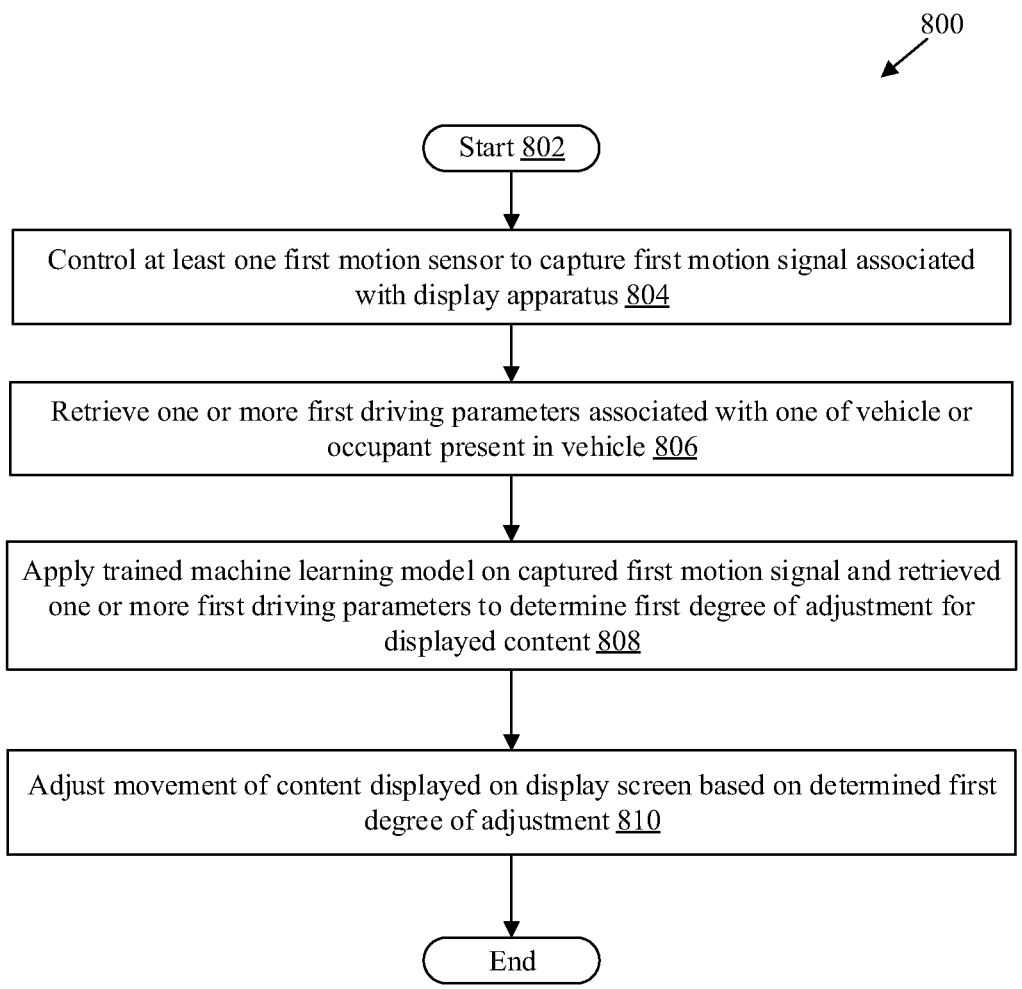
FIG. 8 is a flowchart that illustrates exemplary operations for content adjustment based on the vehicle motion using the machine learning model, in accordance with an embodiment of the disclosure.

At 710, a movement of the portion of the displayed content 120 may be adjusted. The movement of the portion (such as the portion 412) of the displayed content 120 (or the content 404) may be adjusted in response to the captured first motion signal being higher than a predefined threshold (such as the first predefined threshold in FIG. 4). In accordance with an embodiment, the display apparatus 102 or the circuitry 202 may be configured to adjust the movement of the portion of the displayed content 120 in response to the captured first motion signal being higher than the predefined threshold as described, for example, in FIGS. 1, 3, and 4. Control may pass to end FIG. 8 is a flowchart that illustrates exemplary operations for content adjustment based on vehicle motion using machine learning model, in accordance with an embodiment of the disclosure. With reference to FIG. 8, there is shown a flowchart 800. The flowchart 800 is described in conjunction with FIGS. 1, 2, 3, 4, 5, 6, and 7. The operations from 802 to 810 may be implemented, for example, by the display apparatus 102, the circuitry 202, the mobile phone 502, or the neural network model 602 of FIGS. 1, 3, 5, and 6. The operations of the flowchart 800 may start at 802 and proceed to 804.

At 804, at least one first motion sensor 108 may be controlled to capture the first motion signal associated with the display apparatus 102. In accordance with an embodiment, the display apparatus 102 or the circuitry 202 may be configured to control the at least one first motion sensor 108 to capture the first motion signal associated with the display apparatus 102 or the display apparatus 306 as described, for example, in FIGS. 3, 4, and 6.

At 806, one or more first driving parameters associated with one of the vehicle 104 or the occupant 118 present in the vehicle 104 may be retrieved. In accordance to an embodiment, the display apparatus 102 or the circuitry 202 may be configured to retrieve the one or more first driving parameters associated with one of the vehicle 104 or the occupant 118 present in the vehicle 104 (or the vehicle 304) as described, for example, in FIG. 6.

At 808, a trained machine learning model may be applied on the captured first motion signal and the retrieved one or more first driving parameters. The machine learning model 204A (such as the neural network model 602) may be applied on the captured first motion signal and the retrieved one or more first driving parameters to determine a first degree of adjustment for the adjustment of the displayed content 120 (or the content 404). In accordance to an embodiment, the display apparatus 102 or the circuitry 202 may be configured to apply the trained machine learning model 204A on the captured first motion signal and the retrieved one or more first driving parameters to determine the first degree of the adjustment for the displayed content 120. The training and the application of the neural network model 602 is described, for example, in FIG. 6.

At 810, a movement of the displayed content 120 may be adjusted based on the determined first degree of adjustment. In accordance to an embodiment, the display apparatus 102 or the circuitry 202 may be configured to adjust the movement of the displayed content 120 (or the content 404) on the display screen 106 (or the display screen 402) based on the determined first degree of adjustment output by the trained neural network model 602 as described, for example, in FIG. 6. Control may pass to end.

Various embodiments of the disclosure may provide a non-transitory, computer-readable medium and/or storage medium, and/or a non-transitory machine readable medium and/or storage medium stored thereon, a set of instructions executable by a machine and/or a computer for content adjustment based on vehicle motion. The set of instructions may be executable by the machine and/or the computer (for example the display apparatus 102 or the mobile phone 502) to perform operations that may include controlling at least one first motion sensor to capture a first motion signal associated with the display apparatus. The operations may further include controlling an image capturing device to capture a first image of an occupant in a vehicle. The operations may further include determining a region of an eye gaze of the occupant on the display screen based on the captured first image. The determined region on the display screen may include a portion of the displayed content. The operations may further include adjusting a movement of the portion of the displayed content in response to the captured first motion signal being higher than a predefined threshold.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. A display apparatus, comprising:
   a display screen configured to display content;
   at least one first motion sensor;
   an image capturing device disposed at a side of the display apparatus; and
   circuitry coupled to the display screen, the at least one first motion sensor, and the image capturing device, wherein the circuitry is configured to:
   control the at least one first motion sensor to capture a first motion signal associated with a motion of the display apparatus;
   control the image capturing device to capture an image of an occupant in a vehicle;
   determine a region of an eye gaze of the occupant on the display screen based on the captured image, wherein the determined region on the display screen includes a portion of the displayed content;
   detect a movement of a body part of the occupant based on the captured image of the occupant;

determine whether the movement of the body part of the occupant is smaller than a threshold related to a motion of the body part; and adjust a movement of the portion of the displayed content based on:

the movement of the body part of the occupant in a case where the movement is smaller than the threshold, and the captured first motion signal being higher than a predefined threshold.

2. The display apparatus according to claim 1, wherein the circuitry is further configured to stabilize a display position of the portion on the display screen to adjust the movement of the portion of the displayed content.

3. The display apparatus according to claim 1, wherein the circuitry is further configured to:

control at least one second motion sensor to capture a second motion signal associated with a motion of the vehicle, wherein the at least one second motion sensor is disposed on the vehicle, and the second motion signal is different from the first motion signal; and adjust the movement of the portion of the displayed content based on a combination of the captured first motion signal associated with the motion of the display apparatus and the captured second motion signal associated with the motion of the vehicle being higher than the predefined threshold.

4. The display apparatus according to claim 3, wherein the at least one first motion sensor and the at least one second motion sensor comprises at least one of: a tilt sensor, an accelerometer, or a gyroscope sensor.

5. The display apparatus according to claim 3, wherein the first motion signal and the second motion signal comprise at least one of a first component for linear motion, a second component for rotatory motion, or a third component for oscillatory motion.

6. The display apparatus according to claim 1, wherein the display screen is one of: a Multi-Information Display (MID), an automotive Head-Up Display (HUD), an instrument cluster, and/or a display screen of a consumer electronic (CE) device.

7. The display apparatus according to claim 1, further comprising a memory configured to store an association between the captured first motion signal and a degree of adjustment of the movement of the portion, wherein the circuitry is further configured to adjust the movement of the portion based on the stored association between the captured first motion signal and the degree of adjustment.

8. The display apparatus according to claim 1, wherein, the occupant is a driver of the vehicle, and the circuitry is further configured to:

retrieve driving pattern information of the driver from a memory; and adjust the movement of the portion of the displayed content based on the captured first motion signal and the retrieved driving pattern information of the driver.

9. The display apparatus according to claim 1, wherein the circuitry is further configured to:

receive speed information of the vehicle from a speed sensor associated with the vehicle; and adjust the movement of the portion of the displayed content based on the captured first motion signal and the received speed information.

10. The display apparatus according to claim 1, wherein the body part of the occupant comprises at least one of: a hand or a head of the occupant in the vehicle.

11. The display apparatus according to claim 1, wherein the circuitry is further configured to:

retrieve driver profile information associated with the occupant at a first time instant;

determine a first degree of adjustment of the movement of the portion of the displayed content based on the driver profile information associated with the occupant;

adjust the movement of the portion of the displayed content based on the determined first degree of adjustment;

retrieve driver profile information associated with another occupant of the vehicle at a second time instant;

determine a second degree of adjustment, different from the first degree of adjustment, of the movement of the portion of the displayed content based on the driver profile information associated with the other occupant; and adjust the movement of the portion of the displayed content based on the determined second degree of adjustment.

12. The display apparatus according to claim 1, wherein the circuitry is further configured to adjust the displayed content on a center region of the display screen at a higher degree of adjustment compared to the adjustment of the displayed content at a corner region of the display screen.

13. A mobile phone, comprising:

a display screen configured to display content;

at least one first motion sensor;

an image capturing sensor disposed at a side of the mobile phone; and circuitry coupled to the display screen, the at least one first motion sensor, and the image capturing sensor, wherein the circuitry is configured to:

control the at least one first motion sensor to capture a first motion signal associated with a motion of the mobile phone;

control the image capturing sensor to capture an image of an occupant in a vehicle;

determine a region of an eye gaze of the occupant on the display screen based on the captured image, wherein the determined region on the display screen includes a portion of the displayed content;

detect a movement of a body part of the occupant based on the captured image of the occupant;

determine whether the movement of the body part of the occupant is smaller than a threshold related to a motion of the body part; and adjust a movement of the portion of the displayed content based on:

the movement of the body part of the occupant in a case where the movement is smaller than the threshold, and the captured first motion signal being higher than a predefined threshold.

14. The mobile phone according to claim 13, wherein the circuitry is further configured to stabilize a display position of the portion on the display screen to adjust the movement of the portion of the displayed content.

15. The mobile phone according to claim 13, wherein the circuitry is further configured to:

control at least one second motion sensor to capture a second motion signal associated with a motion of the vehicle, wherein the at least one second motion sensor is disposed on the vehicle, and the second motion signal is different from the first motion signal; and adjust the movement of the portion of the displayed content based on a combination of the captured first motion signal associated with the motion of the mobile phone and the captured second motion signal being higher than the predefined threshold associated with the motion of the vehicle.

16. The mobile phone according to claim 15, wherein the at least one first motion sensor and the at least one second motion sensor comprises at least one of: a tilt sensor, an accelerometer, or a gyroscope sensor.

17. A display apparatus, comprising:

a memory configured to store a machine learning model which is trained to determine degree of adjustments of content based on a set of driving parameters of a vehicle and motion information associated with the display apparatus;

at least one first motion sensor;

a display screen configured to display content; and circuitry coupled to the memory, the at least one first motion sensor, and the display screen, wherein the circuitry is configured to:

control the at least one first motion sensor to capture a first motion signal associated with a motion of the display apparatus;

retrieve one or more first driving parameters associated with one of the vehicle or an occupant present in the vehicle;

apply the trained machine learning model on the captured first motion signal and the retrieved one or more first driving parameters to determine a first degree of adjustment for the displayed content;

detect a movement of a body part of the occupant based on an image of the occupant;

determine whether the movement of the body part of the occupant is smaller than a threshold related to a motion of the body part; and adjust a movement of the displayed content on the display screen based on:

the movement of the body part of the occupant in a case where the movement is smaller than the threshold, and the determined first degree of adjustment.

18. The display apparatus according to claim 17, further comprising an image capturing device disposed at a side of the display apparatus, wherein the circuitry is further configured to:

control the image capturing device to capture the image of the occupant present in the vehicle;

determine a region of an eye gaze of the occupant on the display screen based on the captured image, wherein the determined region on the display screen includes a portion of the displayed content; and adjust the movement of the portion of the displayed content based on the determined first degree of adjustment, wherein the determined region on the display screen includes the portion of the displayed content.

19. The display apparatus according to claim 17, wherein the set of driving parameters and the retrieved one or more first driving parameters comprises one of: a speed of the vehicle and driving pattern information of the occupant as a driver of the vehicle.

20. The display apparatus according to claim 17, wherein the circuitry is further configured to:

determine a second driving parameter of the vehicle or the occupant of the vehicle, or capture a second motion signal from the at least one first motion sensor, wherein the second driving parameter or the captured second motion signal is excluded from the set of driving parameters and the motion information, respectively, on which the machine learning model is trained;

determine a second degree of adjustment for the displayed content based on the determined second driving parameter of the vehicle or the occupant, or based on the captured second motion signal; and re-train the machine learning model based on the determined second degree of adjustment for the determined second driving parameter or the captured second motion signal.

* * * * *